United States Patent
Liu et al.

(10) Patent No.: US 12,199,910 B2
(45) Date of Patent: Jan. 14, 2025

(54) TERMINAL APPARATUS, BASE STATION APPARATUS, AND COMMUNICATION METHOD

(71) Applicant: SHARP KABUSHIKI KAISHA, Sakai (JP)

(72) Inventors: Liqing Liu, Sakai (JP); Shohei Yamada, Sakai (JP); Hiroki Takahashi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 380 days.

(21) Appl. No.: 17/795,827

(22) PCT Filed: Feb. 10, 2021

(86) PCT No.: PCT/JP2021/006020
§ 371 (c)(1),
(2) Date: Jul. 27, 2022

(87) PCT Pub. No.: WO2021/162129
PCT Pub. Date: Aug. 19, 2021

(65) Prior Publication Data
US 2023/0070450 A1    Mar. 9, 2023

(30) Foreign Application Priority Data

Feb. 14, 2020    (JP) ................. 2020-023364

(51) Int. Cl.
*H04L 5/00*    (2006.01)
*H04W 48/10*    (2009.01)

(52) U.S. Cl.
CPC .......... *H04L 5/0051* (2013.01); *H04W 48/10* (2013.01)

(58) Field of Classification Search
None
See application file for complete search history.

(56) References Cited

U.S. PATENT DOCUMENTS

| | | | | |
|---|---|---|---|---|
| 11,265,091 B2 * | 3/2022 | Davydov | ............. | H04B 17/318 |
| 11,799,600 B2 * | 10/2023 | Boroujeni | ............ | H04B 7/0695 |
| 11,917,643 B2 * | 2/2024 | Kim | ...................... | H04W 72/30 |

OTHER PUBLICATIONS

CATT, "Summary of Offline Discussion on Remaining Minimum system information", R1-1721473, 3GPP TSG RAN WG1 Meeting 91, Reno, USA, Nov. 27-Dec. 1, 2017.

(Continued)

*Primary Examiner* — Hong S Cho
(74) *Attorney, Agent, or Firm* — ScienBiziP, P.C.

(57) ABSTRACT

A method by a user equipment (UE) is described. The method includes receiving, from a base station, a MIB including first information related to a CORESET for a first search space set for the detected SS/PBCH block, monitoring a set of PDCCH candidates for the first search space set in the CORESET, wherein the CORESET comprises a first set of consecutive OFDM symbols and a second set of consecutive OFDM symbols, the CORESET is transmitted by a first time periodicity, the second set of consecutive OFDM symbols is transmitted after a first time offset from the first OFDM symbol for the first set of consecutive OFDM symbols. Further receiving second information indicating the first time offset.

15 Claims, 12 Drawing Sheets

(56) References Cited

OTHER PUBLICATIONS

"3rd Generation Partnership Project; Technical Specification Group Radio Access Network; NR; Physical layer procedures for control(Release 16)", 3GPP TS 38.213 V16.0.0(Dec. 2019), Jan. 14, 2020.

Qualcomm Incorporated, "Feature lead summary on initial access signals and channels for NR-U", R1-1913491, 3GPP TSG RAN WG1 Meeting #99, Reno, Nevada, US, Nov. 18-22, 2019.

* cited by examiner

| Index | O | Number of search space sets per slot | M | First symbol index |
|---|---|---|---|---|
| 0 | 0 | 1 | 1 | 0 |
| 1 | 0 | 2 | 1/2 | {0, if $i$ is even}, {$N^{CORESET}_{symb}$, if $i$ is odd} |
| 2 | 2 | 1 | 1 | 0 |
| 3 | 2 | 2 | 1/2 | {0, if $i$ is even}, {$N^{CORESET}_{symb}$, if $i$ is odd} |
| 4 | 5 | 1 | 1 | 0 |
| 5 | 5 | 2 | 1/2 | {0, if $i$ is even}, {$N^{CORESET}_{symb}$, if $i$ is odd} |
| 6 | 7 | 1 | 1 | 0 |
| 7 | 7 | 2 | 1/2 | {0, if $i$ is even}, {$N^{CORESET}_{symb}$, if $i$ is odd} |
| 8 | 0 | 1 | 2 | 0 |
| 9 | 5 | 1 | 2 | 0 |
| 10 | 0 | 1 | 1 | 1 |
| 11 | 0 | 1 | 1 | 2 |
| 12 | 2 | 1 | 1 | 1 |
| 13 | 2 | 1 | 1 | 2 |
| 14 | 5 | 1 | 1 | 1 |
| 15 | 5 | 1 | 1 | 2 |

| Index | $O$ | Number of search space sets per slot | $M$ | First symbol index |
|---|---|---|---|---|
| 0 | 0 | 1 | 1 | 0 |
| 1 | 0 | 2 | 1/2 | {0, if $i$ is even}, {7, if $i$ is odd} |
| 2 | 2.5 | 1 | 1 | 0 |
| 3 | 2.5 | 2 | 1/2 | {0, if $i$ is even}, {7, if $i$ is odd} |
| 4 | 5 | 1 | 1 | 0 |
| 5 | 5 | 2 | 1/2 | {0, if $i$ is even}, {7, if $i$ is odd} |
| 6 | 0 | 2 | 1/2 | {0, if $i$ is even}, {$N_{symb}^{CORESET}$, if $i$ is odd} |
| 7 | 2.5 | 2 | 1/2 | {0, if $i$ is even}, {$N_{symb}^{CORESET}$, if $i$ is odd} |
| 8 | 5 | 2 | 1/2 | {0, if $i$ is even}, {$N_{symb}^{CORESET}$, if $i$ is odd} |
| 9 | 7.5 | 1 | 1 | 0 |
| 10 | 7.5 | 2 | 1/2 | {0, if $i$ is even}, {7, if $i$ is odd} |
| 11 | 7.5 | 2 | 1/2 | {0, if $i$ is even}, {$N_{symb}^{CORESET}$, if $i$ is odd} |
| 12 | 0 | 1 | 2 | 0 |
| 13 | 5 | 1 | 2 | 0 |
| 14 | Reserved | | | |
| 15 | Reserved | | | |

FIG. 6

One REG or one resource block during one OFDM symbol.

TERMINAL APPARATUS, BASE STATION APPARATUS, AND COMMUNICATION METHOD

TECHNICAL FIELD

The present disclosure relates to a terminal apparatus, a base station apparatus, a communication method, and an integrated circuit.

BACKGROUND ART

At present, as a radio access system and a radio network technology aimed for the fifth generation cellular system, technical investigation and standard development are being conducted, as extended standards of Long Term Evolution (LTE), on LTE-Advanced Pro (LTE-A Pro) and New Radio technology (NR) in The Third Generation Partnership Project (3GPP).

In the fifth generation cellular system, three services of enhanced Mobile BroadBand (eMBB) to achieve high-speed and large-volume transmission, Ultra-Reliable and Low Latency Communication (URLLC) to achieve low-latency and high-reliability communication, and massive Machine Type Communication (mMTC) to allow connection of a large number of machine type devices such as Internet of Things (IoT) have been demanded as assumed scenarios.

For example, wireless communication devices may communicate with one or more devices for multiple service types. For some device types, a lower complexity would be required such as to reduce the Rx/Tx antennas and/or the RF bandwidth. However, given the reduced antennas and/or the bandwidth, current existing systems and methods, for example, where a PDCCH reception is confined in one set of consecutive OFDM symbols, may only offer limited flexibility and efficiency for multiple service communication. As illustrated by this discussion, systems and methods according to the prevent invention, supporting one PDCCH reception on multiple sets of consecutive OFDM symbols, may improve reception/transmission reliability and coverage, and provide the communication flexibility and efficiency.

BRIEF DESCRIPTION OF THE DRAWINGS

FIG. 5 illustrates one example 500 of parameters configuration for a set of consecutive symbols for PDCCH monitoring.

FIG. 6 illustrates another example 600 of parameters configuration for a set of consecutive symbols for PDCCH monitoring.

DESCRIPTION OF EMBODIMENTS

Figure 1:
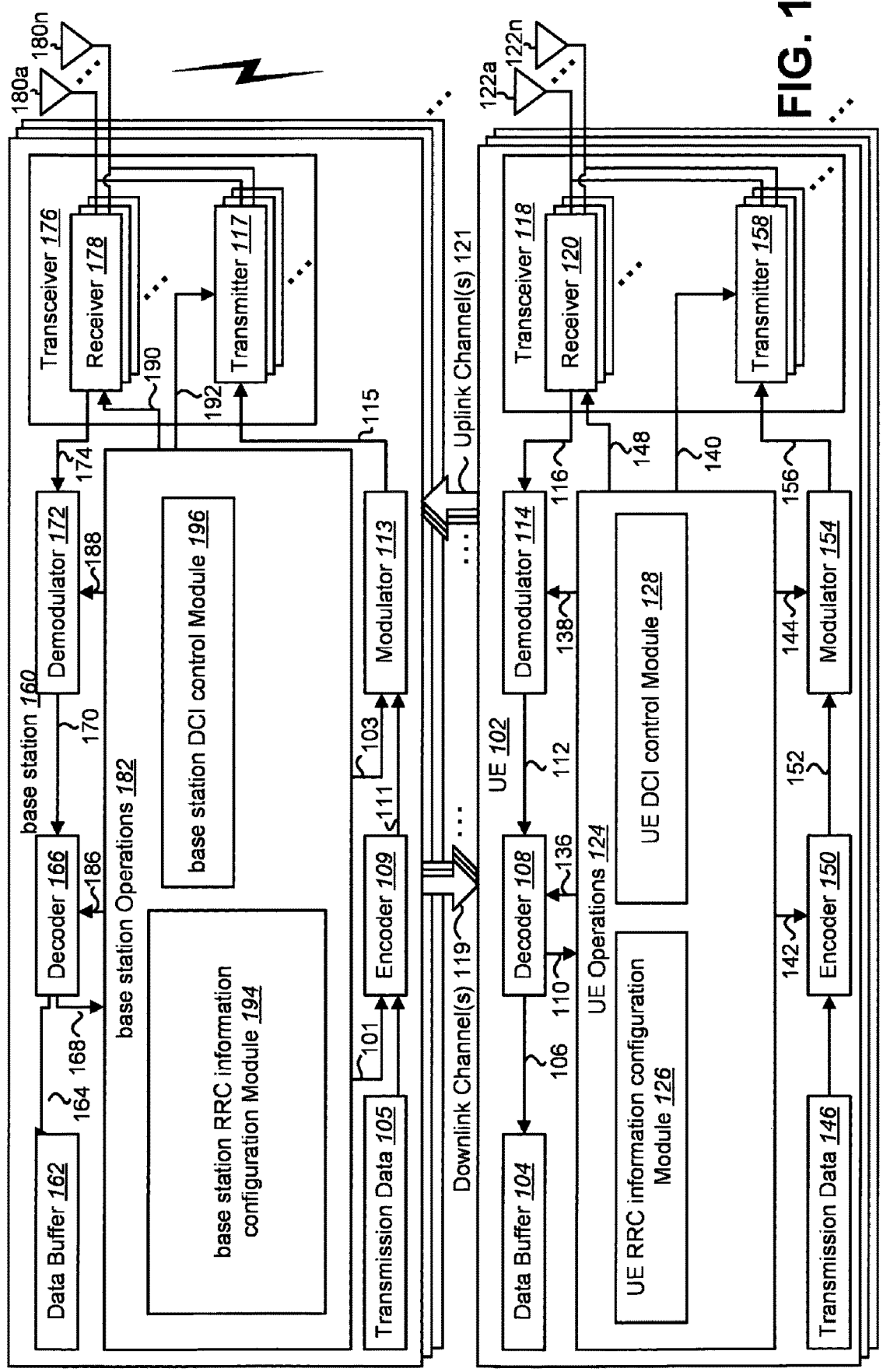
FIG. 1 is a block diagram illustrating one configuration of one or more base stations and one or more user equipments (UEs) in which systems and methods for PDCCH monitoring in aggregated PDCCH monitoring occasions may be implemented.

A method by a user equipment (UE) is described. The method includes receiving, from a base station, a MIB including first information related to a CORESET for a first search space set for the detected SS/PBCH block, monitoring a set of PDCCH candidates for the first search space set in the CORESET, wherein the CORESET comprises a first set of consecutive OFDM symbols and a second set of consecutive OFDM symbols, the CORESET is transmitted by a first time periodicity, the second set of consecutive OFDM symbols is transmitted after a first time offset from the first OFDM symbol for the first set of consecutive OFDM symbols. Further receiving second information indicating the first time offset.

A method by a base station is described. The method includes transmitting a SS/PBCH block with a first index, transmitting, to a user equipment (UE), a MIB including first information related to a CORESET for a first search space set for the detected SS/PBCH block, determining resource of the CORESET used for transmitting a set of PDCCH candidates for the first search space set, wherein the CORESET comprises a first set of consecutive OFDM symbols and a second set of consecutive OFDM symbols, the CORESET is transmitted by a first time periodicity, the second set of consecutive OFDM symbols is transmitted after a first time offset from the first OFDM symbol for the first set of consecutive OFDM symbols. Further transmitting second information indicating the first time offset.

A user equipment (UE) is described. The UE includes reception circuitry configured to detect a SS/PBCH block with a first index, to receive, from a base station, a MIB including first information related to a CORESET for a first search space set for the detected SS/PBCH block, processing circuitry configured to monitor a set of PDCCH candidates for the first search space set in the CORESET, wherein the CORESET comprises a first set of consecutive OFDM symbols and a second set of consecutive OFDM symbols, the CORESET is transmitted by a first time periodicity, the second set of consecutive. OFDM symbols is transmitted after a first time offset from the first OFDM symbol for the first set of consecutive OFDM symbols. The reception circuitry configured to further receive second information, wherein the second information indicates the first time offset.

A base station is described. The base station includes transmission circuitry configured to transmit a SS/PBCH block with a first index, to transmit, to a user equipment (UE), a MIB including first information related to a CORESET for a first search space set for the detected SS/PBCH block, processing circuitry configured to determine resource of the CORESET used for transmitting a set of PDCCH candidates for the first search space set, wherein the CORESET comprises a first set of consecutive OFDM symbols and a second set of consecutive OFDM symbols, the CORESET is transmitted by a first time periodicity, the second set of consecutive OFDM symbols is transmitted after a first time offset from the first OFDM symbol for the first set of consecutive OFDM symbols. The transmission circuitry configured to further transmit second information, wherein the second information indicates the first time offset.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN). 3GPP NR (New Radio) is the name given to a project to improve the LTE mobile phone or device standard to cope with future requirements. In one aspect, LTE has been modified- to provide support and specification (TS 38.331, 38.321, 38.300, 37.300, 38.211, 38.212, 38.213, 38.214, etc) for the New Radio Access (NR) and Next generation-Radio Access Network (NG-RAN).

At least some aspects of the systems and methods disclosed herein may be described in relation to the 3GPP LTE, LTE-Advanced (LTE-A), LTE-Advanced Pro, New Radio Access (NR), and other 3G/4G/5G standards (e.g., 3GPP Releases 8, 9, 10, 11, 12, 13, 14, and/or 15, and/or Narrow Band-Internet of Things (NB-IoT)). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE (User Equipment), an access terminal, a subscriber station, a mobile terminal, a remote station, a user terminal, a terminal, a subscriber unit, a mobile device, a relay node, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a gNB, a Node B, an eNB, a home enhanced or evolved Node B (HeNB) or some other similar terminology. As the scope of the disclosure should not be limited to 3GPP standards, the terms "base station,", "gNB", "Node B," "eNB," and "HeNB" may be used interchangeably herein to mean the more general term "base station." Furthermore, one example of a "base station" is an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may be any communication channel that is specified by standardization or regulatory bodies to be used for International Mobile Telecommunications-Advanced (IMT-Advanced), IMT-2020 (5G) and all of it or a subset of it may be adopted by 3GPP as licensed bands (e.g., frequency bands) to be used for communication between a base station and a UE. It should also be noted that in NR, NG-RAN, E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by a base station to transmit or receive information. "Configured cell(s)" may be serving cell(s). The UE may receive system information and perform the required measurements on configured cells. "Configured cell(s)" for a radio connection may consist of a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The base stations may be connected by the NG interface to the 5G-core network (5G-CN). 5G-CN may be called as to NextGen core (NGC), or 5G core (5GC). The base stations may also be connected by the S1 interface to the evolved packet core (EPC). For instance, the base stations may be connected to a NextGen (NG) mobility management function by the NG-2 interface and to the NG core User Plane (UP) functions by the NG-3 interface. The NG interface supports a many-to-many relation between NG mobility management functions, NG core UP functions and the base stations. The NG-2 interface is the NG interface for the control plane and the NG-3 interface is the NG interface for the user plane. For instance, for EPC connection, the base stations may be connected to a mobility management entity (MME) by the S1-MME interface and to the serving gateway (S-GW) by the S1-U interface. The S1 interface supports a many-to-many relation between MMES, serving gateways and the base stations. The S1-MME interface is the S1 interface for the control plane and the S1-U interface is the S1 interface for the user plane. The Uu interface is a radio interface between the UE and the base station for the radio protocol.

The radio protocol architecture may include the user plane and the control plane. The user plane protocol stack may include packet data convergence protocol (PDCP), radio link control (RLC), medium access control (MAC) and physical (PHY) layers. A DRB (Data Radio Bearer) is a radio bearer that carries user data (as opposed to control plane signaling). For example, a DRB may be mapped to the user plane protocol stack. The PDCP, RLC, MAC and PHY sublayers (terminated at the base station 460a on the network) may perform functions (e.g., header compression, ciphering, scheduling, ARQ and HARQ) for the user plane. PDCP entities are located in the PDCP sublayer. RLC entities may be located in the RLC sublayer. MAC entities may be located in the MAC sublayer. The PHY entities may be located in the PHY sublayer.

The control plane may include a control plane protocol stack. The PDCP sublayer (terminated in base station on the network side) may perform functions (e.g., ciphering and integrity protection) for the control plane. The RLC and MAC sublayers (terminated in base station on the network side) may perform the same functions as for the user plane. The Radio Resource Control (RRC) (terminated in base station on the network side) may perform the following functions. The RRC may perform broadcast functions, paging, RRC connection management, radio bearer (RB) control, mobility functions, UE measurement reporting and control. The Non-Access Stratum (NAS) control protocol (terminated in MME on the network side) may perform, among other things, evolved packet system (EPS) bearer management, authentication, evolved packet system connection management (ECM)-IDLE mobility handling, paging origination in ECM-IDLE and security control.

Signaling Radio Bearers (SRBs) are Radio Bearers (RB) that may be used only for the transmission of RRC and NAS messages. Three SRBs may be defined. SRB0 may be used for RRC messages using the common control channel (CCCH) logical channel. SRB1 may be used for RRC messages (which may include a piggybacked NAS message) as well as for NAS messages prior to the establishment of SRB2, all using the dedicated control channel (DCCH) logical channel. SRB2 may be used for RRC messages which include logged measurement information as well as for NAS messages, all using the DCCH logical channel. SRB2 has a lower-priority than SRB1 and may be configured by a network (e.g., base station) after security activation. A broadcast control channel (BCCH) logical channel may be used for broadcasting system information. Some of BCCH logical channel may convey system information which may be sent from the network to the UE via BCH (Broadcast Channel) transport channel. BCH may be sent on a physical broadcast channel (PBCH). Some of BCCH logical channel may convey system information which may be sent from the network to the UE via DL-SCH (Downlink Shared Channel) transport channel. Paging may be provided by using paging control channel (PCCH) logical channel.

For example, the DL-DCCH logical channel may be used (but not limited to) for a RRC reconfiguration message, a RRC reestablishment message, a RRC release, a UE Capability Enquiry message, a DL Information Transfer message or a Security Mode Command message. UL-DCCH logical channel may be used (but not limited to) for a measurement report message, a RRC Reconfiguration Complete message, a RRC Reestablishment Complete message, a RRC Setup Complete message, a Security Mode Complete message, a Security Mode Failure message, a UE Capability Information, message, a UL Handover Preparation Transfer message, a UL Information Transfer message, a Counter Check Response message, a UE Information Response message, a Proximity Indication message, a RN (Relay Node) Reconfiguration Complete message, an MBMS Counting Response message, an inter Frequency RSTD Measurement Indication message, a UE Assistance Information message, an In-device Coexistence Indication message, an MBMS Interest Indication message, an SCG Failure Information message. DL-CCCH logical channel may be used (but not limited to) for a RRC Connection Reestablishment message, a RRC Reestablishment Reject message, a RRC Reject message, or a RRC Setup message. UL-CCCH logical channel may be used (but not limited to) for a RRC Reestablishment Request message, or a RRC Setup Request message.

System information may be divided into the MasterinformationBlock (MIB) and a number of SystemInformationBlocks (SIBs).

The UE may receive one or more RRC messages from the base station to obtain RRC configurations or parameters. The RRC layer of the UE may configure RRC layer and/or lower layers (e.g., PHY layer, MAC layer, RLC layer, PDCP layer) of the UE according to the RRC configurations or parameters which may be configured by the RRC messages, broadcasted system information, and so on. The base station may transmit one or more RRC messages to the UE to cause the UE to configure RRC layer and/or lower layers of the UE according to the RRC configurations or parameters which may be configured by the RRC messages, broadcasted system information, and so on.

When carrier aggregation is configured, the UE may have one RRC connection with the network. One radio interface may provide carrier aggregation. During RRC establishment, re-establishment and handover, one serving cell may provide Non-Access Stratum (NAS) mobility information (e.g., a tracking area identity (TAI)). During RRC re-establishment and handover, one serving cell may provide a security input. This cell may be referred to as the primary cell (PCell). In the downlink, the component carrier corresponding to the PCell may be the downlink primary component carrier (DL PCC), while in the uplink it may be the uplink primary component carrier (UL PCC).

Depending on UE capabilities, one or more SCells may be configured to form together with the PCell a set of serving cells. In the downlink, the component carrier corresponding to an SCell may be a downlink secondary component carrier (DL SCC), while in the uplink it may be an uplink secondary component carrier (UL SCC).

The configured set of serving cells for the UE, therefore, may consist of one PCell and one or more SCells. For each SCell, the usage of uplink resources by the UE (in addition to the downlink resources) may be configurable. The number of DL SCCs configured may be larger than or equal to the number of UL SCCs and no SCell may be configured for usage of uplink resources only.

From a UE viewpoint, each uplink resource may belong to one serving cell. The number of serving cells that may be configured depends on the aggregation capability of the UE. The PCell may only be changed using a handover procedure (e.g., with a security key change and a random access procedure). A PCell may be used for transmission of the PUCCH. A primary secondary cell (PSCell) may also be used for transmission of the PUCCH. The PSCell may be referred to as a primary SCG cell or SpCell of a secondary cell group. The PCell or PSCell may not be de-activated. Re-establishment may be triggered when the PCell experiences radio link failure (RLF), not when the SCells experience RLF. Furthermore, NAS information may be taken from the PCell.

The reconfiguration, addition and removal of SCells may be performed by RRC. At handover or reconfiguration with sync, Radio Resource Control (RRC) layer may also add, remove or reconfigure SCells for usage with a target PCell. When adding a new SCell, dedicated RRC signaling may be used for sending all required system information of the SCell (e.g., while in connected mode, UEs need not acquire broadcasted system information directly from the SCells).

The systems and methods described herein may enhance the efficient use of radio resources in Carrier aggregation (CA) operation. Carrier aggregation refers to the concurrent utilization of more than one component carrier (CC). In carrier aggregation, more than one cell may be aggregated to a UE. In one example, carrier aggregation may be used to increase the effective bandwidth available to a UE. In traditional carrier aggregation, a single base station is assumed to provide multiple serving cells for a UE. Even in scenarios where two or more cells may be aggregated (e.g., a macro cell aggregated with remote radio head (RRH) cells) the cells may be controlled (e.g., scheduled) by a single base station.

The systems and methods described herein may enhance the efficient use of radio resources in Carrier aggregation operation. Carrier aggregation refers to the concurrent utilization of more than one component carrier (CC). In carrier aggregation, more than one cell may be aggregated to a UE. In one example, carrier aggregation may be used to increase the effective bandwidth available to a UE. In traditional carrier aggregation, a single base station is assumed to provide multiple serving cells for a UE. Even in scenarios where two or more cells may be aggregated (e.g., a macro cell aggregated with remote radio head (RRH) cells) the cells may be controlled (e.g., scheduled) by a single base station. However, in a small cell deployment scenario, each node (e.g., base station, RRH, etc.) may have its own independent scheduler. To maximize the efficiency of radio resources utilization of both nodes, a UE may connect to two or more nodes that have different schedulers. The systems and methods described herein may enhance the efficient use of radio resources in dual connectivity operation. A UE may be configured multiple groups of serving cells, where each group may have carrier aggregation operation (e.g., if the group includes more than one serving cell).

In Dual Connectivity (DC) the UE may be required to be capable of UL-CA with simultaneous PUCCH/PUCCH and PUCCH/PUSCH transmissions across cell-groups (CGs). In a small cell deployment scenario, each node (e.g., eNB, RRH, etc.) may have its own independent scheduler. To maximize the efficiency of radio resources utilization of both nodes, a UE may connect to two or more nodes that have different schedulers. A UE may be configured multiple groups of serving cells, where each group may have carrier aggregation operation (e.g., if the group includes more than one serving cell). A UE in RRC_CONNECTED may be configured with Dual Connectivity or MR-DC, when configured with a Master and a Secondary Cell Group. A Cell Group (CG) may be a subset of the serving cells of a UE, configured with Dual Connectivity (DC) or MR-DC, i.e. a Master Cell Group (MCG) or a Secondary Cell Group (SCG). The Master Cell Group may be a group of serving cells of a UE comprising of the PCell and zero or more secondary cells. The Secondary Cell Group (SCG) may be a group of secondary cells of a UE, configured with DC or MR-DC, comprising of the PSCell and zero or more other secondary cells. A Primary Secondary Cell (PSCell) may be the SCG cell in which the UE is instructed to perform random access when performing the SCG change procedure. "PSCell" may be also called as a Primary SCG Cell. In Dual Connectivity or MR-DC, two MAC entities may be configured in the UE: one for the MCG and one for the SCG. Each MAC entity may be configured by RRC with a serving cell supporting PUCCH transmission and contention based Random Access. In a MAC layer, the term Special Cell (SpCell) may refer to such cell, whereas the term SCell may refer to other serving cells. The term SpCell either may refer to the PCell of the MCG or the PSCell of the SCG depending on if the MAC entity is associated to the MCG or the SCG, respectively. A Timing Advance Group (TAG) containing the SpCell of a MAC entity may be referred to as primary TAG (pTAG), whereas the term secondary TAG (sTAG) refers to other TAGs.

DC may be further enhanced to support Multi-RAT Dual Connectivity (MR-DC). MR-DC may be a generalization of the Intra-E-UTRA Dual Connectivity (DC) described in 36.300, where a multiple Rx/Tx UE may be configured to utilize resources provided by two different nodes connected via non-ideal backhaul, one providing E-UTRA access and the other one providing NR access. One node acts as a Mater Node (MN) and the other as a Secondary Node (SN). The MN and SN are connected via a network interface and at least the MN is connected to the core network. In DC, a PSCell may be a primary secondary cell. In EN-DC, a PSCell may be a primary SCG cell or SpCell of a secondary cell group.

E-UTRAN may support MR-DC via E-UTRA-NR Dual Connectivity (EN-DC), in which a UE is connected to one eNB that acts as a MN and one en-gNB that acts as a SN. The en-gNB is a node providing NR user plane and control plane protocol terminations towards the UE, and acting as Secondary Node in EN-DC. The eNB is connected to the EPC via the S1 interface and to the en-gNB via the X2 interface. The en-gNB might also be connected to the EPC via the S1-U interface and other en-gNBs via the X2-U interface.

A timer is running once it is started, until it is stopped or until it expires; otherwise it is not running. A timer can be started if it is not running or restarted if it is running. A Timer may be always started or restarted from its initial value.

For NR, a technology of aggregating NR carriers may be studied. Both lower layer aggregation like Carrier Aggregation (CA) for LTE and upper layer aggregation like DC are investigated. From layer 2/3 point of view, aggregation of carriers with different numerologies may be supported in NR.

The main services and functions of the RRC sublayer may include the following:
Broadcast of System Information related to Access Stratum (AS) and Non Access Stratum (NAS);
Paging initiated by CN or RAN;
Establishment, maintenance and release of an RRC connection between the UE and NR RAN including:
Addition, modification and release of carrier aggregation;
Addition, modification and release of Dual Connectivity in NR or between LTE and NR;
Security functions including key management;
Establishment, configuration, maintenance and release of signaling radio bearers and data radio bearers;
Mobility functions including:
Handover;
UE cell selection and reselection and control of cell selection and reselection;
Context transfer at handover.
QoS management functions;
UE measurement reporting and control of the reporting;
NAS message transfer to/from NAS from/to UE.

Each MAC entity of a UE may be configured by RRC with a Discontinuous Reception (DRX) functionality that controls the UE's PDCCH monitoring activity for the MAC entity's C-RNTI (Radio Network Temporary Identifier), CS-RNTI, INT-RNTI, SFI-RNTI, SP-CSI-RNTI, TPC-PUCCH-RNTI, TPC-PUSCH-RNTI, and TPC-SRS-RNTI.
For scheduling at cell level, the following identities are used:
C (Cell)-RNTI: unique UE identification used as an identifier of the RRC Connection and for scheduling;

CS (Configured Scheduling)-RNTI: unique UE identification used for Semi-Persistent Scheduling in the downlink;

INT-RNTI: identification of pre-emption in the downlink;

P-RNTI: identification of Paging and System Information change notification in the downlink;

SI-RNTI: identification of Broadcast and System Information in the downlink;

SP-CSI-RNTI: unique UE identification used for semi-persistent CSI reporting on PUSCH;

For power and slot format control, the following identities are used:

SFI-RNTL identification of slot format;

TPC-PUCCH-RNTI: unique UE identification to control the power of PUCCH;

TPC-PUSCH-RNTI: unique UE identification to control the power of PUSCH;

TPC-SRS-RNTI: unique UE identification to control the power of SRS;

During the random access procedure, the following identities are also used:

RA-RNTI: identification of the Random Access Response in the downlink;

Temporary C-RNTI: UE identification temporarily used for scheduling during the random access procedure;

Random value for contention resolution: UE identification temporarily used for contention resolution purposes during the random access procedure.

For NR connected to 5GC, the following UE identities are used at NG-RAN level:

I-RNTI: used to identify the UE context in RRC INACTIVE.

The size of various fields in the time domain is expressed in time units $T_c=1/(\Delta f_{max} \cdot N_f)$ where $\Delta f_{max}=480 \cdot 10^3$ Hz and $N_f=4096$. The constant $\kappa=T_s/T_c=64$ where $T_s=1/(\Delta f_{ref} \cdot N_{f,ref})$, $\Delta f_{ref}=15 \cdot 10^3$ Hz and $N_{f,ref}=2048$.

Multiple OFDM numerologies are supported as given by Table 4.2-1 of [TS 38.211] where μ and the cyclic prefix for a bandwidth part are obtained from the higher-layer parameter subcarrierSpacing and cyclicPrefix, respectively.

The size of various fields in the time domain may be expressed as a number of time units $T_s=1/(15000 \times 2048)$ seconds. Downlink and uplink transmissions are organized into frames with $T_f=(\Delta f_{max} N_f/100) \cdot T_c=10$ ms duration, each consisting of ten subframes of $T_{sf}=(\Delta f_{max} N_f/1000) \cdot T_c=1$ ms duration. The number of consecutive OFDM symbols per subframe is $N_{sYmb}^{subframe,\mu}=N_{symb}^{slot} N_{slot}^{subframe,\mu}$. Each frame is divided into two equally-sized half-frames of five subframes each with half-frame 0 consisting of subframes 0-4 and half-frame 1 consisting of subframes 5-9.

For subcarrier spacing (SCS) configuration μ, slots are numbered $n_s^\mu \in \{0, \ldots, N_{slot}^{subframe,\mu}-1\}$ in increasing order within a subframe and $n_{s,f}^\mu \in \{0, \ldots, N_{slot}^{frame,\mu}-1\}$ in increasing order within a frame. $N_{slot}^{subframe,\mu}$ is the number of slots per subframe for subcarrier spacing configuration μ. There are $N_{symb}^{slot}$ consecutive OFDM symbols in a slot where $N_{symb}^{slot}$ depends on the cyclic prefix as given by Tables 4.3.2-1 and 4.3.2-2 of [TS 38.211]. The start of slot $n_s^\mu$ in a subframe is aligned in time with the start of OFDM symbol $n_s^\mu N_{symb}^{slot}$ in the same subframe. Subcarrier spacing refers to a spacing (or frequency bandwidth) between two consecutive subcarrier in the frequency domain. For example, the subcarrier spacing can be set to 15 kHz, 30 kHz, 60 kHz, 120 kHz, or 240 kHz. A resource block is defined as a number of consecutive subcarriers (e.g. 12) in the frequency domain. For a carrier with different frequency, the applicable subcarrier may be different. For example, for a carrier in a frequency rang 1, a subcarrier spacing only among a set of {15 kHz, 30 kHz, 60 kHz} is applicable. For a carrier in a frequency rang 2, a subcarrier spacing only among a set of {60 kHz, 120 kHz, 240 kHz} is applicable. The base station may not configure an inapplicable subcarrier spacing for a carrier.

OFDM symbols in a slot can be classified as 'downlink', 'flexible', or 'uplink'. Signaling of slot formats is described in subclause 11.1 of [TS 38.213].

In a slot in a downlink frame, the UE may assume that downlink transmissions only occur in 'downlink' or 'flexible' symbols. In a slot in an uplink frame, the UE may only transmit in 'uplink' or 'flexible' symbols.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one configuration of one or more base stations 160 (e.g., eNB, gNB) and one or more user equipments (UEs) 102 in which systems and methods for PDCCH monitoring in aggregated PDCCH monitoring occasions may be implemented. The one or more UEs 102 may communicate with one or more base stations 160 using one or more antennas 122a-n. For example, a UE 102 transmits electromagnetic signals to the base station 160 and receives electromagnetic signals from the base station 160 using the one or more antennas 122a-n. The base station 160 communicates with the UE 102 using one or more antennas 180a-n.

It should be noted that in some configurations, one or more of the UEs 102 described herein may be implemented in a single device. For example, multiple UEs 102 may be combined into a single device in some implementations. Additionally or alternatively, in some configurations, one or more of the base stations 160 described herein may be implemented in a single device. For example, multiple base stations 160 may be combined into a single device in some implementations. In the context of FIG. 1, for instance, a single device may include one or more UEs 102 in accordance with the systems and methods described herein. Additionally or alternatively, one or more base stations 160 in accordance with the systems and methods described herein may be implemented as a single device or multiple devices.

The UE 102 and the base station 160 may use one or more channels 119, 121 to communicate with each other. For example, a UE 102 may transmit information or data to the base station 160 using one or more uplink (UL) channels 121 and signals. Examples of uplink channels 121 include a physical uplink control channel (PUCCH) and a physical uplink shared channel (PUSCH), etc. Examples of uplink signals include a demodulation reference signal (DMRS) and a sounding reference signal (SRS), etc. The one or more base stations 160 may also transmit information or data to the one or more UEs 102 using one or more downlink (DL) channels 119 and signals, for instance. Examples of downlink channels 119 include a PDCCH, a PDSCH, etc. A PDCCH can be used to schedule DL transmissions on PDSCH and UL transmissions on PUSCH, where the Downlink Control Information (DCI) on PDCCH includes downlink assignment and uplink scheduling grants. The PDCCH is used for transmitting Downlink Control Information (DCI) in a case of downlink radio communication (radio communication from the base station to the UE). Here, one or more DCIS (may be referred to as DCI formats) are defined for transmission of downlink control information. Information bits are mapped to one or more fields defined in a DCI format. Examples of downlink signals include a primary synchronization signal (PSS), a secondary synchronization signal (SSS), a cell-specific reference signal (CRS), a non-zero power channel state information reference signal (NZP CSI-RS), and a zero power channel state information reference signal (ZP CSI-RS), etc. Other kinds of channels or signals may be used.

Each of the one or more UEs 102 may include one or more transceivers 118, one or more demodulators 114, one or more decoders 108, one or more encoders 150, one or more modulators 154, one or more data buffers 104 and one or more UE operations modules 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals (e.g., downlink channels, downlink signals) from the base station 160 using one or more antennas 122a-n. For example, the receiver 120 may receive and downconvert signals to produce one or more received signals 116. The one or more received signals 116 may be provided to a demodulator 114. The one or more transmitters 158 may transmit signals (e.g., uplink channels, uplink signals) to the base station 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more base stations 160. The UE operations module 124 may include a UE RRC information configuration module 126. The UE operations module 124 may include a UE DCI control module 128. In some implementations, the UE operations module 124 may include physical (PHY) entities, Medium Access Control (MAC) entities, Radio Link Control (RLC) entities, packet data convergence protocol (PDCP) entities, and an Radio Resource Control (RRC) entity. For example, the UE RRC information configuration module 126 may process RRC parameter for search space configurations. The UE DCI control module (processing module) 128 may determine when and where to monitor or search the configured PDCCH candidates for each search space set in a CORESET based on the processing output from the UE RRC information configuration module 126. The CORESET may comprise one or more sets of consecutive OFDM symbols. The UE DCI control module 128 may determine, according to the output from the UE RRC information configuration module 126, resource for each set of consecutive OFDM symbols (e.g. the number of consecutive OFDM symbols for each set, the time location and frequency location for each set, a time duration during which the sets of consecutive OFDM symbols are comprised of the CORESET).

The UE operations module 124 may provide the benefit of performing PDCCH candidate search and monitoring efficiently.

The UE operations module 124 may provide information 148 to the one or more receivers 120. For example, the UE operations module 124 may inform the receiver(s) 120 when or when not to receive transmissions based on the Radio Resource Control (RRC) message (e.g, broadcasted system information, RRC reconfiguration message), MAC control element, and/or the DCI (Downlink Control Information). The UE operations module 124 may provide information 148, including the PDCCH monitoring occasions and DCI format size, to the one or more receivers 120. The UE operation module 124 may inform the receiver(s) 120 when or where to receive/monitor the PDCCH candidate for DCI formats with which DCI size.

The UE operations module 124 may provide information 138 to the demodulator 114. For example, the UE operations module 124 may inform the demodulator 114 of a modulation pattern anticipated for transmissions from the base station 160.

The UE operations module 124 may provide information 136 to the decoder 108. For example, the UE operations module 124 may inform the decoder 108 of an anticipated encoding for transmissions from the base station 160. For example, the UE operations module 124 may inform the decoder 108 of an anticipated PDCCH candidate encoding with which DCI size for transmissions from the base station 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the base station 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the base station 160. The one or more transmitters 158 may upconvert and transmit the modulated signal(s) 156 to one or more base stations 160.

The base station 160 may include one or more transceivers 176, one or more demodulators 172, one or more decoders 166, one or more encoders 109, one or more modulators 113, one or more data buffers 162 and one or more base station operations modules 182. For example, one or more reception and/or transmission paths may be implemented in a base station 160. For convenience, only a single transceiver 176, decoder 166, demodulator 172, encoder 109 and modulator 113 are illustrated in the base station 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals (e.g., uplink channels, uplink signals) from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals (e.g., downlink channels, downlink signals) to the UE 102 using one or more antennas 180a—n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The base station 160 may use the decoder 166 to decode signals. The decoder 166 may produce one or more decoded signals 164, 168. For example, a first base station-decoded signal 164 may comprise received payload data, which may be stored in a data buffer 162. A second base station-decoded signal 168 may comprise overhead data and/or control data. For example, the second base station-decoded signal 168 may provide data (e.g., PUSCH transmission data) that may be used by the base station operations module 182 to perform one or more operations.

In general, the base station operations module 182 may enable the base station 160 to communicate with the one or more UEs 102. The base station operations module 182 may include a base station RRC information configuration module 194. The base station operations module 182 may include a base station DCI control module 196. The base station operations module 182 may include PHY entities, MAC entities, RLC entities, PDCP entities, and an RRC entity. For example, the base station operation module 196 may determine, for UE(s), when and where to monitor or search the configured PDCCH candidates for each search space set.

The base station DCI control module 196 may determine, for respective UE, when and where to monitor or search a configured PDCCH candidate for a search space set in a CORESET. The base station DCI control module 196 may determine a CORESET comprising one or more sets of consecutive OFDM symbols. The base station DCI control module 196 may further determine resource for each set of consecutive OFDM symbols (e.g. the number of consecutive OFDM symbols for each set, the time location and frequency location for each set, a time duration during which the sets of consecutive OFDM symbols are comprised of the CORESET) and input these information to the base station RRC information configuration module 194. The base station RRC information configuration module 194 may generate RRC parameters for search space configurations and CORESET configuration based on the output from the base station DCI control module 196.

The base station operations module 182 may provide the benefit of performing PDCCH candidate search and monitoring efficiently.

The base station operations module 182 may provide information 190 to the one or more receivers 178. For example, the base station operations module 182 may inform the receiver(s) 178 when or when not to receive transmissions based on the RRC message (e.g, broadcasted system information, RRC reconfiguration message), MAC control element, and/or the DCI (Downlink Control Information).

The base station operations module 182 may provide information 188 to the demodulator 172. For example, the base station operations module 182 may inform the demodulator 172 of a modulation pattern anticipated for transmissions from the UE(s) 102.

The base station operations module 182 may provide information 186 to the decoder 166. For example, the base station operations module 182 may inform the decoder 166 of an anticipated encoding for transmissions from the UE(s) 102.

The base station operations module 182 may provide information 101 to the encoder 109. The information 101 may include data to be encoded and/or instructions for encoding. For example, the base station operations module 182 may instruct the encoder 109 to encode transmission data 105 and/or other information 101.

In general, the base station operations module 182 may enable the base station 160 to communicate with one or more network nodes (e.g., a NG mobility management function, a NG core UP functions, a mobility management entity (MME), serving gateway (S-GW), gNBs). The base station operations module 182 may also generate a RRC reconfiguration message to be signaled to the UE 102.

The encoder 109 may encode transmission data 105 and/or other information 101 provided by the base station operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The base station operations module 182 may provide information 103 to the modulator 113. This information 103 may include instructions for the modulator 113. For example, the base station operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The base station operations module 182 may provide information 192 to the one or more transmitters 117. This information 192 may include instructions for the one or more transmitters 117. For example, the base station operations module 182 may instruct the one or more transmitters 117 when to (or when not to) transmit a signal to the UE(s) 102. The base station operations module 182 may provide information 192, including the PDCCH monitoring occasions and DCI format size, to the one or more transmitters 117. The base station operation module 182 may inform the transmitter(s) 117 when or where to transmit the PDCCH candidate for DCI formats with which DCI size. The one or more transmitters 117 may upconvert and transmit the modulated signal(s) 115 to one or more UEs 102.

It should be noted that one or more of the elements or parts thereof included in the base station(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

A base station may generate a RRC message including the one or more RRC parameters, and transmit the RRC message to a UE. A UE may receive, from a base station, a RRC message including one or more RRC parameters. The term 'RRC parameter(s)' in the present disclosure may be alternatively referred to as 'RRC information element(s)'. A RRC parameter may further include one or more RRC parameter(s). In the present disclosure, a RRC message may include system information. a RRC message may include one or more RRC parameters. A RRC message may be sent on a broadcast control channel (BCCH) logical channel, a common control channel (CCCH) logical channel or a dedicated control channel (DCCH) logical channel.

In the present disclosure, a description 'a base station may configure a UE to' may also imply/refer to 'a base station may transmit, to a UE, an RRC message including one or more RRC parameters'. Additionally or alternatively, aRC parameter configure a UE to' may also refer to 'a base station may transmit, to a UE, an RRC message including one or more RRC parameters'. Additionally or alternatively, 'a UE is configured to' may also refer to 'a UE may receive, from a base station, an RRC message including one or more RRC parameters'.

A base station may transmit a RRC message including one or more RRC parameters related to BWP configuration to a UE. A UE may receive the RRC message including one or more RRC parameters related to BWP configuration from a base station. For each cell, the base station may configure at least an initial DL BWP and one initial uplink bandwidth parts (initial UL BWP) to the UE. Furthermore, the base station may configure additional UL and DL BWPs to the UE for a cell.

A RRC parameters initialDownlinkBWP may indicate the initial downlink BWP (initial DL BWP) configuration for a serving cell (e.g., a SpCell and Scell). The base station may configure the RRC parameter locationAndBandwidth included in the initialDownlinkBWP so that the initial DL BWP contains the entire CORESET 0 of this serving cell in the frequency domain. The locationAndBandwidth may be used to indicate the frequency domain location and bandwidth of a BWP. A RRC parameters initialUplinkBWP may indicate the initial uplink BWP (initial UL BWP) configuration for a serving cell (e.g., a SpCell and Scell). The base station may transmit initialDownlinkBWP and/or initialUplinkBWP which may be included in SIB1, RRC parameter ServingCellConfigCommon, or RRC parameter ServingCellConfig to the UE. SIB1, which is a cell-specific system information block (SystemInformationBlock, SIB), may contain information relevant when evaluating if a UE is allowed to access a cell and define the scheduling of other system information. SIB1 may also contain radio resource configuration information that is common for all UEs and barring information applied to the unified access control. The RRC parameter ServingCellConfigCommon is used to configure cell specific parameters of a UE's serving cell. The RRC parameter ServingCellConfig is used to configure (add or modify) the UE with a serving cell, which may be the SpCell or an SCell of an MCS or SCG. The RRC parameter ServingCellConfig herein are mostly UE specific but partly also cell specific.

The base station may~configure the UE with a RRC parameter BWP-Downlink and a RRC parameter BWP-Uplink. The RRC parameter BWP-Downlink can be used to configure an additional DL BWP. The RRC parameter BWP-Uplink can be used to configure an additional UL BWP. The base station may transmit the BWP-Downlink and the BWP-Uplink which may be included in RRC parameter ServingCellConfig to the UE.

If a UE is not configured (provided) initialDownlinkBWP from a base station, an initial DL BWP is defined by a location and number of contiguous physical resource blocks (PRBs), starting from a PRB with the lowest index and ending at a PRB with the highest index among PRBs of a CORESET for Type0-PDCCH CSS set (i.e., CORESET 0), and a subcarrier spacing (SCS) and a cyclic prefix for PDCCH reception in the CORESET for Type0-PDCCH CSS set. If a UE is configured (provided) initialDownlinkBWP from a base station, the initial DL BWP is provided by initialDownlinkBWP. If a UE is configured (provided) initialUplinkBWP from a base station, the initial UL BWP is provided by initialUplinkBWP.

The UE may be configured by the based station, at least one initial BWP and up to 4 additional BWP(s). One of the initial BWP and the configured additional BWP(s) may be activated as an active BWP. The UE may monitor DCI format, and/or receive PDSCH in the active DL BWP. The UE may not monitor DCI format, and/or receive PDSCH in a DL BWP other than the active DL BWP. The UE may transmit PUSCH and/or PUCCH in the active UL BWP. The UE may not transmit PUSCH and/or PUCCH in a BWP other than the active UL BWP.

As above-mentioned, a UE may monitor DCI format in the active DL BWP. To be more specific, a UE may monitor a set of PDCCH candidates' in one or more CORESETs on the active DL BWP on each activated serving cell configured with PDCCH monitoring according to corresponding search space set where monitoring implies decoding each PDCCH candidate according to the monitored DCI formats.

A set of PDCCH candidates for a UE to monitor is defined in terms of PDCCH search space sets. A search space set can be a CSS set or a USS set. A UE may monitor a set of PDCCH candidates in one or more of the following search space sets a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG a Type0A-PDCCH CSS set configured by searchSpaceOtherSystemInformation in PDCCH-ConfigCommon for a DCI format with CRC scrambled by a SI-RNTI on the primary cell of the MCG a Type1-PDCCH CSS set configured by ra-SearchSpace in PDCCH-ConfigCommon for a DCI format with CRC scrambled by a RA-RNTI or a TC-RNTI on the primary cell a Type2-PDCCH CSS set configured by paging-SearchSpace in PDCCH-ConfigCommon for a DCI format with CRC scrambled by a P-RNTI on the primary cell of the MCG a Type3-PDCCH CSS set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, or TPC-SRS-RNTI and, only for the primary cell, C-RNTI, MCS-C-RNTI, or CS-RNTI(s), and a USS set configured by SearchSpace in PDCCH-Config with searchSpaceType=ue-Specific for DCI formats with CRC scrambled by C-RNTI, MCS-C-RNTI, SP-CSI-RNTI, or CS-RNTI(s).

For a DL BWP, if a UE is configured (provided) one above-described search space set, the UE may determine PDCCH monitoring occasions for a set of PDCCH candidates of the configured search space set. PDCCH monitoring occasions for monitoring PDCCH candidates of a search space set s is determined according to the search space set s configuration and a CORESET configuration associated with the search space set s. In other words, a UE may monitor a set of PDCCH candidates of the search space set in the determined (configured) PDCCH monitoring occasions in one or more configured control resource sets (CORESETs) according to the corresponding search space set configurations and CORESET configuration. A base station may transmit, to a UE, information to specify one or more CORESET configuration and/or search space configuration. The information may be included in MIB and/or SIBs broadcasted by the base station. The information may be included in RRC configurations or RRC parameters. A base station may broadcast system information such as MIB, SIBs to indicate CORESET configuration or search space configuration to a UE. Or the base station may transmit a RRC message including one or more RRC parameters related to CORESET configuration and/or search space configuration to a UE.

An illustration of search space set configuration is described below.

A base station may transmit a RRC message including one or more RRC parameters related to search space configuration. A base station may determine one or more RRC parameter(s) related to search space configuration for a UE. A UE may receive, from a base station, a RRC message including one or more RRC parameters related to search space configuration. RRC parameter(s) related to search space configuration (e.g. SearchSpace, searchSpaceZero) defines how and where to search for PDCCH candidates. 'search/monitor for PDCCH candidate for a DCI format' may also refer to 'monitor/search for a DCI format' for short.

For example, a RRC parameter searchSpaceZero is used to configure a common search space 0 of an initial DL BWP. The searchSpaceZero corresponds to 4 bits. The base station may transmit the searchSpaceZero via PBCH(MIB) or ServingCell.

Additionally, a RRC parameter SearchSpace is used to define how/where to search for PDCCH candidates. The RRC parameters search space may include a plurality of RRC parameters as like, searchSpaceId, controlResource-SetId, monitoringSlotPeriodicityAndOffset, duration, monitoringSymbolsWithinSlot, nrofCandidates, searchSpaceType. Some of the above-mentioned RRC parameters may be present or absent in the RRC parameters SearchSpace. Namely, the RRC parameter SearchSpace may include all the above-mentioned RRC parameters. Namely, the RRC parameter SearchSpace may include one or more of the above-mentioned RRC parameters. If some of the parameters are absent in the RRC parameter SearchSpace, the UE 102 may apply a default value for each of those parameters.

Herein, the RRC parameter searchSpaceId is an identity or an index of a search space. The RRC parameter searchSpaceId is used to identify a search space. Or rather, the RRC parameter serchSpaceId provide a search space set index s Then a search space s hereinafter may refer to a search space identified by index s indicated by RRC parameter searchSpaceId. The RRC parameter controlResourceSetId concerns an identity of a CORESET, used to identify a CORESET. The RRC parameter controlResourceSetId indicates an association between the search space s and the CORESET identified by controlResourceSetId. The RRC parameter controlResourceSetId indicates a CORESET applicable for the search space. CORESET p hereinafter may refer to a CORESET identified by index p indicated by RRC parameter controlResourceSetId. Each search space is associated with one CORESET. The RRC parameter monitoringSlotPeriodicityAndOffset is used to indicate slots for PDCCH monitoring configured as periodicity and offset. Specifically, the RRC parameter monitoringSlotPeriodicityAndOffset indicates a PDCCH monitoring periodicity of $k_s$ slots and a PDCCH monitoring offset of $o_s$ slots. A UE can determine which slot is configured for PDCCH monitoring according to the RRC parameter monitoringSlotPeriodicityAndOffset. The RRC parameter monitoringSymbolsWithinSlot is used to indicate a first symbol(s) for PDCCH monitoring in the slots configured for PDCCH monitoring. That is, the parameter monitoringSymbolsWithinSlot provides a PDCCH monitoring pattern within a slot, indicating first symbol(s) of the CORESET within a slot (configured slot) for PDCCH monitoring. The RRC parameter duration indicates a number of consecutive slots $T_s$ that the search space lasts (or exists) in every occasion (PDCCH occasion, PDCCH monitoring occasion).

The RRC parameter may include aggregationLevel1, aggregationLevel2, aggregationLevel4, aggregationLevel8, aggregationLevel16. The RRC parameter nrofCandidates may provide a number of PDCCH candidates per CCE aggregation level L by aggregationLevel1, aggregationLevel2, aggregationLevel4, aggregationLevel8, and aggregationLevel16, for CCE aggregation level 1, CCE aggregation level 2, CCE aggregation level 4, for CCE aggregation level 8, and CCE aggregation level 16, respectively. In other words, the value L can be set to either one in the set {1, 2, 4, 8, 16}. The number of PDCCH candidates per CCE aggregation level L can be configured as 0, 1, 2, 3, 4, 5, 6, or 8. For example, in a case the number of PDCCH candidates per CCE aggregation level L is configured as 0, the UE may not search for PDCCH candidates for CCE aggregation L. That is, in this case, the UE may not monitor PDCCH candidates for CCE aggregation L of a search space set s. For example, the number of PDCCH candidates per CCE aggregation level L is configured as 4, the UE may monitor 4 PDCCH candidates for CCE aggregation level L of a search space set s.

The RRC parameter searchSpaceType is used to indicate that the search space set s is either a CSS set or a USS set. The RRC parameter searchSpaceType may include either a common or a ue-Specific. The RRC parameter common configure the search space set s as a CSS set and DCI format to monitor. The RRC parameter ue-Specific configures the search space set s as a USS set. The RRC parameter ue-Specific may include dci-Formats. The RRC parameter dci-Formats indicates to monitor PDCCH candidates either for DCI format 0_0 and DCI format 1_0, or for DCI format 0_1 and DCI format 1_1 in search space set s. That is, the RRC parameter searchSpaceType indicates whether the search space set s is a CSS set or a USS set as well as DCI formats to monitor for.

A USS at CCE aggregation level L is defined by a set of PDCCH candidates for CCE aggregation L. A USS set may be constructed by a plurality of USS corresponding to respective CCE aggregation level L. A USS set may include one or more USS(s) corresponding to respective CCE aggregation level L. A CSS at CCE aggregation level L is defined by a set of PDCCH candidates for CCE aggregation L. A CSS set may be constructed by a plurality of USS corresponding to respective CCE aggregation level L. A CSS set may include one or more CSS(s) corresponding to respective CCE aggregation level L.

Herein, 'a UE monitor PDCCH for a search space set s' also refers to 'a UE may monitor a set of PDCCH candidates of the search space set s'. Alternatively, 'a UE monitor PDCCH for a search space set s' also refers to 'a UE may attempt to decode each PDCCH candidate of the search space set s according to the monitored DCI formats'.

In the present disclosure, the term "PDCCH search space sets" may also refer to "PDCCH search space". A UE monitors PDCCH candidates in one or more of search space sets. A search space sets can be a common search space (CSS) set or a UE-specific search space (USS) set. In some implementations, a CSS set may be shared/configured among multiple UEs. The multiple UEs may search PDCCH candidates in the CSS set. In some implementations, a USS set is configured for a specific UE. The UE may search one or more PDCCH candidates in the USS set. In some implementations, a USS set may be at least derived from a value of C-RNTI addressed to a UE.

An illustration of CORESET configuration is described below.

A base station may configure a UE one or more CORESETs for each DL BWP in a serving cell. For example, a RRC parameter ControlResourceSetZero is used to configure CORESET 0 of an initial DL BWP. The RRC parameter ControlResourceSetZero corresponds to 4 bits. The base station may transmit ControlResourceSetZero, which may be included in MIB or RRC parameter ServingCellConfigCommon, to the UE. MIB may include the system information transmitted on BCH(PBCH). A RRC parameter related to initial DL BWP configuration may also include the RRC parameter ControlResourceSetZero. RRC parameter ServingCellConfigCommon is used to configure cell specific parameters of a UE's serving cell and contains parameters which a UE would typically acquire from SSB, MIB or SIBs when accessing the cell form IDLE.

Additionally, a RRC parameter ControlResourceSet is used to configure a time and frequency CORESET other than CORESET 0. The RRC parameter ControlResourceSet may include a plurality of RRC parameters such as, ControlResourceSedd, frequencyDomainResource, duration, cce-REG-MappingType, precoderGranularity, tci-PresentInDCI, pdcch-DMRS-ScramblingID and so on.

Here, the RRC parameter ControlResourceSetId is an CORESET index p, used to identify a CORESET within a serving cell, where 0<p<12. The RRC parameter duration indicates a number of consecutive symbols of the CORESET $N_{symb}^{CORESET}$ which can be configured as 1, 2 or 3 symbols. A CORESET consists of a set of $N_{RB}^{CORESET}$ resource blocks (RBs) in the frequency domain and $N_{symb}^{CORESET}$ symbols in the time domain. The RRC parameter frequencyDomainResource indicates the set of $N_{RB}^{CORESET}$ RBs for the CORESET. Each bit in the frequencyDomainResource corresponds a group of 6 RBs, with grouping starting from the first RB group in the BWP. The first (left-most/most significant) bit corresponds to the first RB group in the BWP, and so on. A bit that is set to 1 indicates that this RB group belongs to the frequency domain resource of this CORESET.

According to the CORESET configuration, a CORESET (a CORESET 0 or a CORESET p) consists of a set of PRBs with a time duration of 1 to 3 OFDM symbols. The resource units Resource Element Groups (REGs) and Control Channel Elements (CCEs) are defined within a CORESET. A CCE consisting of 6 REGs where a REG equals one resource block during one OFDM symbol. Control channels are formed by aggregation of CCE. That is, a PDCCH consists of one or more CCEs. Different code rates for the control channels are realized by aggregating different number of CCE. Interleaved and non-interleaved CCE-to-REG mapping are supported in a CORESET. Each resource element group carrying PDCCH carries its own DMRS.

Figure 2:
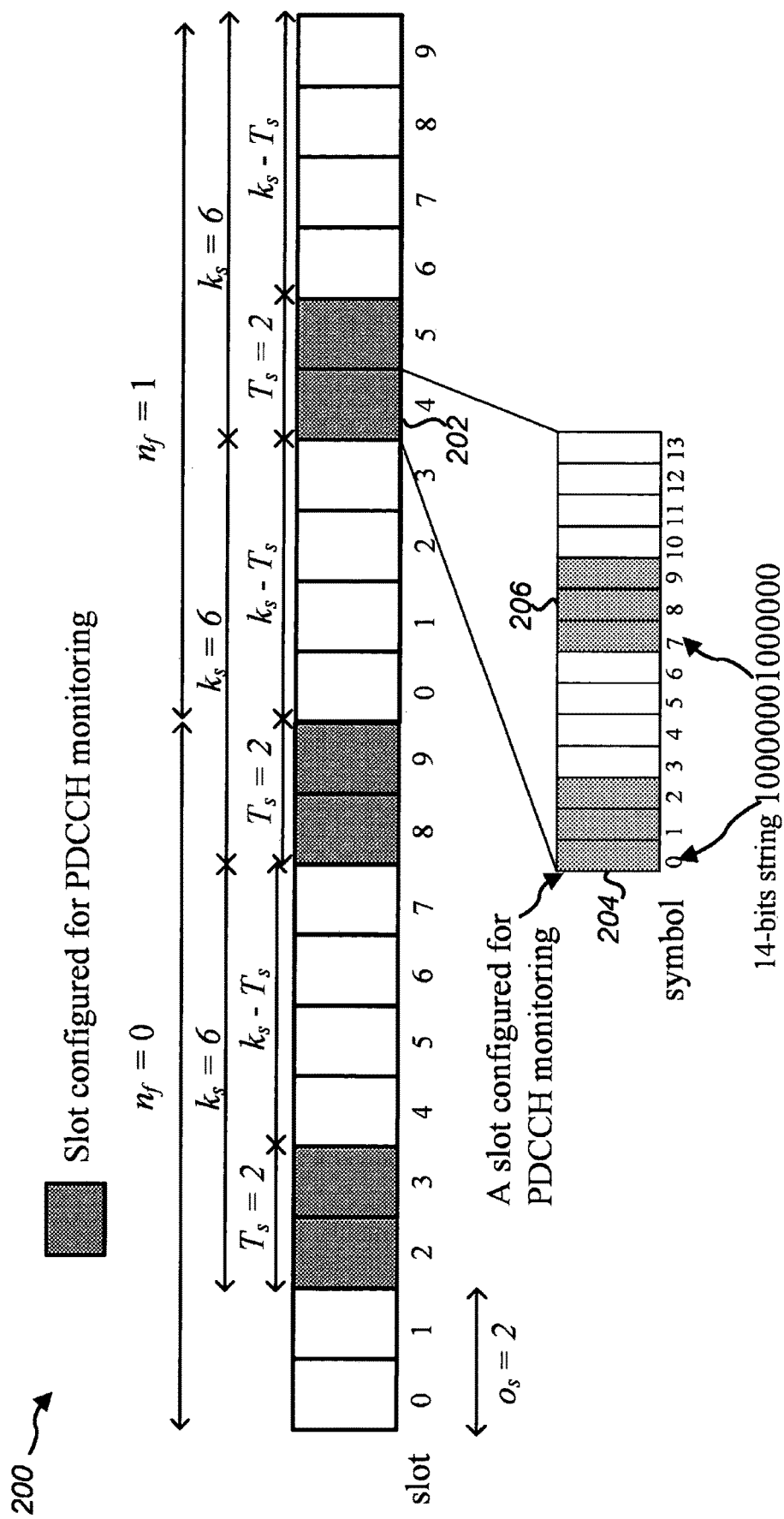
FIG. 2 is a diagram illustrating one example 200 how to determine PDCCH monitoring occasions for PDCCH candidates based on corresponding search space set configuration and CORESET configuration.

In order to monitor a set of PDCCH candidates of a search space set, the UE may determine PDCCH monitoring occasions according to the search space set configuration and associated CORESET configuration. FIG. 2 is a diagram illustrating one example 200 how to determine PDCCH monitoring occasions for PDCCH candidates based on corresponding search space set configuration and CORESET configuration.

In FIG. 2, the PDCCH monitoring periodicity $k_s$ is configured as 6 slots. The PDCCH monitoring offset $o_s$ is configured as 2 slots. The duration $T_s$ is configured as 2 slots. The subcarrier spacing configuration u is configured as 0, which means the subcarrier spacing of the active DL BWP is 15 kHz. In this case u=0, $N^{frame,u}_{slot}$ is equal to 10. That is, in a case u=0, the number of slots per frame is 10. $n^u_{s,f}$ is the slot number within a radio frame. That is, the value of $n^u_{s,f}$ is in a range of $\{0, \ldots, N^{frame,u}_{slot}-1\}$.

The UE 102 may determine a PDCCH monitoring occasion on an active DL BWP from the PDCCH monitoring periodicity, the PDCCH monitoring offset, and the PDCCH monitoring pattern within a slot for each configured search space set s. For a search space set s, the UE 102, if the slot with number $n^u_{s,f}$ satisfies Formula (1) $(n_f * N^{frame,u}_{slot} + n^u_{s,f} - o_s) \bmod k_s = 0$, may determine that a PDCCH monitoring occasion(s) exists in a slot with number $n^u_{s,f}$ in a frame with number $n_f$. According to Formula (1), the UE 102 may determine the slots with number $n^u_{s,f}=2$ and $n^u_{s,f}=8$ in a frame with number $n_f=0$ and the slot with number $n^u_{s,f}=4$ in a frame with number $n_f=1$ as the slots in which the PDCCH monitoring occasions exists. Given the $T_s$ is configured as 2 slots, the UE 102 may monitor PDCCH candidates for search space set s for $T_s=2$ consecutive slots, staring from the determined slots with number $n^u_{s,f}$. In other words, the UE 102 may not monitor PDCCH candidates for search space set s for the next $(k_s-T_s)$ consecutive slots. As depicted in FIG. 2, the UE 102 may determine the slots with number $n^u_{s,f}=2, 3, 8,$ and 9 in a frame with number $n_f=0$ and the slots with number $n^u_{s,f}=4,$ and 5 in a frame with number $n_f=1$ as the slots having PDCCH monitoring occasions. The UE 102 may monitor PDCCH candidates for search space set s in the determined slots configured for PDCCH monitoring. A slot having PDCCH monitoring occasions may also refer to a slot configured for PDCCH monitoring.

Furthermore, a slot determined (or configured) for PDCCH monitoring may have one or more than one PDCCH monitoring occasions. PDCCH monitoring pattern within the slot configured for PDCCH monitoring is indicated by a 14-bits string (monitoringSymbolsWithinSlot). Each bit within the 14-bits string may correspond to a symbol within a slot, respectively. The most significant (left) bit (MSB) may represent the first OFDM in a slot, and the second most significant (left) bit may represent the second OFDM symbol in a slot and so on. The bit(s) set to one may identify the first OFDM symbol(s) of the control resource set within a slot. As depicted in FIG. 2, a slot 202 configured for PDCCH monitoring may have two PDCCH monitoring occasions. The first PDCCH monitoring occasion 204 is located on the first, second and third consecutive symbols. The second PDCCH monitoring occasion 206 is located on the $8^{th}$, $9^{th}$, $10^{th}$ consecutive OFDM symbols. The duration of one PDCCH monitoring occasion is equal to the duration of a CORESET associated with the search space set s. Generally, the duration of one PDCCH monitoring occasion (the number of the consecutive OFDM symbols for one PDCCH monitoring occasion) can be 1, 2 or 3 symbols. In the FIG. 2, a CORESET comprises one PDCCH monitoring occasion with 3 consecutive ODM symbols in the time domain.

According to the FIG. 2, the UE may monitor a set of PDCCH candidates for the search space set s in the first PDCCH monitoring occasion 204 in the associated CORESET and may further monitor a set of PDCCH candidates for the search space set s in the second PDCCH monitoring occasion 206 in the CORESET in each slot in which the PDCCH monitoring is configured for the search space set s. Here, each PDCCH candidate for the search space set s is mapped in a resource of the associated CORESET in each PDCCH monitoring occasion. In other words, one PDCCH candidate for the search space set s is mapped to one associated CORESET in one PDCCH monitoring occasion. One PDCCH candidate for the search space set s is not mapped to more than one associated CORESET in different PDCCH monitoring occasions. For example, one PDCCH candidate for the search space set s is not mapped to both the first PDCCH monitoring occasion 204 and the second PDCCH monitoring occasion 206.

For some new type device which may have less reception antennas or reduced RF bandwidth compared to the Release 15/16 device, some performance as like the coverage, or the reliability of PDCCH reception would be affected. Solutions as like to repeat the PDCCH candidate transmission or to utilize more resource of a CORESET to map one PDCCH candidate would be necessary for improve the coverage or the PDCCH reception reliability. However, PDCCH repetition in each CORESET increases the blind decoding number for the PDCCH reception and result in a serve blind decoding burden of control channel for the new type device. Solution as like to increase the resource of a CORESET, which results in a lower code rate of PDCCH reception and would not increase the number of blind decoding, would be beneficial for the new type device.

For the new type device, resource of CORESET in the frequency domain is limited. Moreover, according to the FIG. 2, the existing concept of a CORESET is that the CORESET in the time domain comprises one set of consecutive OFDM symbols (also referred as to one PDCCH monitoring occasion) with 1, 2 or 3 symbols. Therefore, removing the limitation that a CORESET comprising consecutive OFDM symbols can provide a flexibility of allocating resource for a CORESET and help to allocate a more resource in the time domain for the CORESET. In the present disclosure, a UE may monitor a PDCCH candidate of a search space set in a CORESET comprising one or more set of consecutive OFDM symbols. These sets can be consecutive or non-consecutive in the time domain.

In an implementation of the present disclosure, a mapping of each PDCCH candidate to a CORESET which comprises one or more sets of consecutive OFDM symbols is introduced. By mapping one PDCCH candidate to the CORESET comprising one or more sets of consecutive OFDM symbols, more resource used for each PDCCH candidate results in a lower code rate of the PDCCH, which eventually improve the PDCCH reception reliability and coverage.

Figure 3:
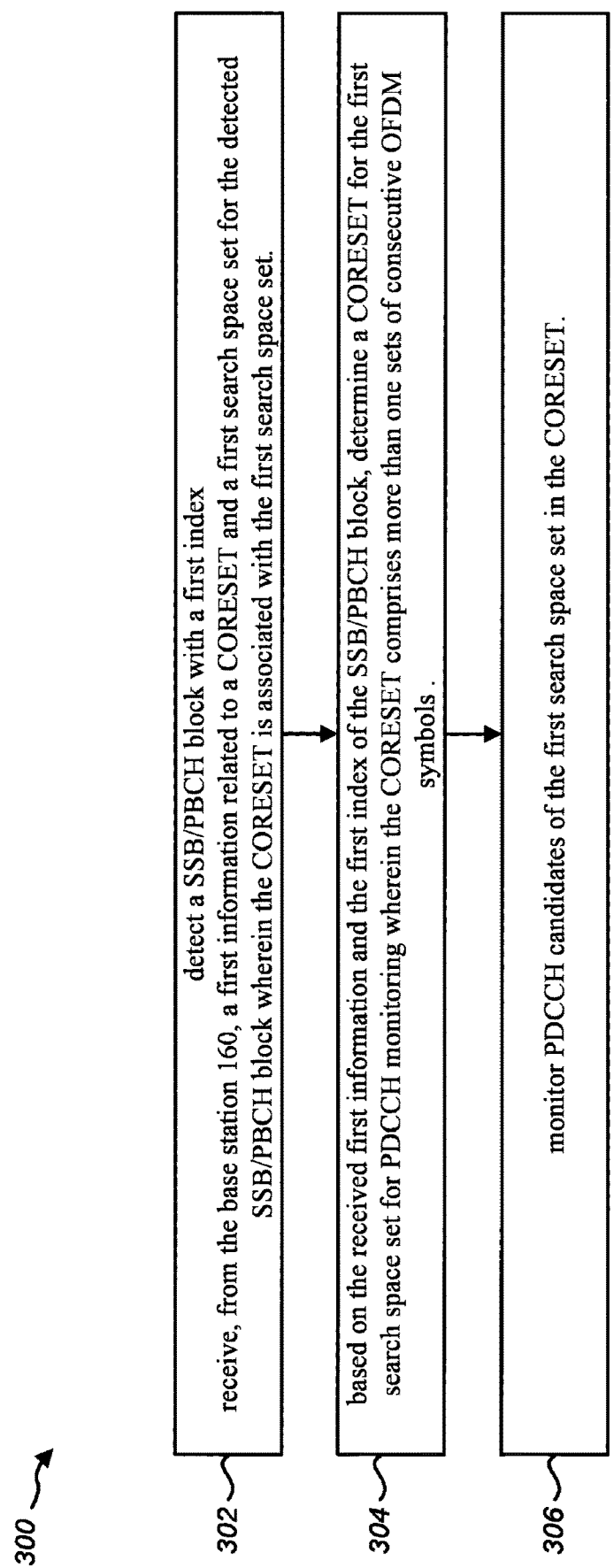
FIG. 3 is a flow diagram illustrating one implementation of a method 300 for determining a CORESET for PDCCH monitoring by a UE 102.

FIG. 3 is a flow diagram illustrating one implementation of a method 300 for determining a CORESET for PDCCH monitoring by a UE 102.

The UE 102 may detect 302, a SSB/PBCH block with a first index which is transmitted by the base station 160. The UE 102 may receive, from a base station, a first information related to a CORESET and a first search space set for the detected SSB/PBCH block where the CORESET is associated with the first search space set. The first information is included in the MIB (or SIB) which is broadcasted by the base station 160. The first information may be further separated into two parts (e.g. controlResourceSetZero and searchSpaceZero), wherein each part corresponds to 4 bits. Additionally, the UE 102 may receive, from the base station 160, a RRC parameter indicating the first information. The first search space set may refer to the Type0-PDCCH CSS set mentioned above. The CORESET for the first search space set has CORESET index 0 and the first search space set (the Type0-PDCCH CSS set) has search space set index 0.

The UE 102 may 304, based on the received first information and/or the first index of the detected SSB/PBCH block, determine the CORESET for the first search space set for PDCCH monitoring in terms of the time domain and the frequency domain. In other words, the UE 102 may determine a resource (control resource) to be used for PDCCH monitoring for the first search space set in terms of the frequency domain and the time domain. At 306, the UE 102 may monitor, a set of PDCCH candidates of the first search space in the CORESET. The CORESET is transmitted by a first time periodicity. The base station 160 may map a PDCCH candidate of the first search space in the one or more sets of consecutive OFDM symbols which are comprised of the CORESET and transmit the PDCCH candidate to the UE 102. The UE may attempt to decode each configured PDCCH candidate of the first search space set according to the monitored DCI format in the CORESET comprising one or more sets of consecutive OFDM symbols.

At 304, according to the first information (e.g. controlResourceSetZero), the UE 102 may determine a number of consecutive resource blocks and/or a number of symbols for the CORESET. In time domain, the CORESET may comprise one or more than one sets of consecutive OFDM symbols. The total number of symbols for the CORESET is a total number by summating all symbols of the one or more than one sets of which the CORESET is comprised. The sets for the CORESET can be contiguous or can be not contiguous in the time domain. In other words, the symbols of the CORESET can be contiguous or can be not-contiguous in the time domain.

Herein, the CORESET in a set of consecutive OFDM symbols can be also regarded as a sub-CORESET of the CORESET. The CORESET may comprise one or more than one sub-CORESETs in each corresponding set of consecutive OFDM symbols. For example, the CORESET may comprise a first set of consecutive OFDM symbols and a second set of consecutive OFDM symbols. The CORESET in the first set of consecutive OFDM symbols can be regarded as a first sub-CORESET of the CORESET. The CORESET in the second set of consecutive OFDM symbols can be regarded as a second sub-CORESET of the CORESET. A set of consecutive OFDM symbols may be also referred to as a sub-CORESET of a CORESET. Additionally, a set of consecutive OFDM symbols may be also referred to as a CORESET in a PDCCH monitoring occasion. That is, the CORESET for PDCCH monitoring (e.g. a PDCCH candidate monitoring) may comprise one or more than one the CORESET in respective corresponding PDCCH monitoring occasion.

In an example, each set of consecutive OFDM symbols may consist of a same number of consecutive OFDM symbols. The same number of consecutive OFDM symbols for each set can be determined based on the first information as 1 OFDM symbol, 2 OFDM symbols or 3 OFDM symbols and so on. That is, the UE 102 may determine, based on the first information, the number of consecutive OFDM symbols for the first set and/or the number of consecutive OFDM symbols for the second set(s). The second set of consecutive OFDM symbols may be transmitted after a first time offset from the first OFDM symbol for the first set of consecutive OFDM symbols.

Figure 4:
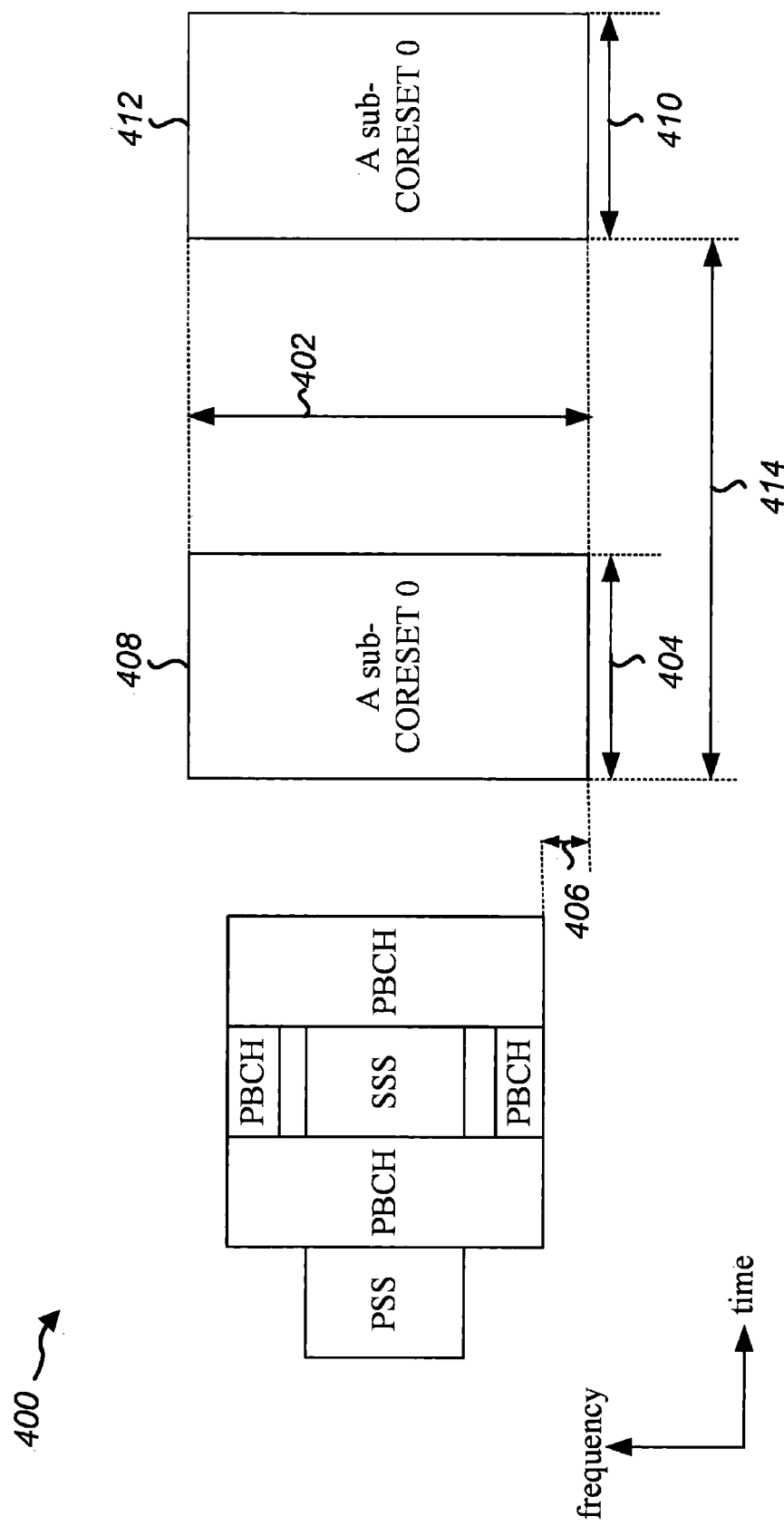
FIG. 4 is a diagram illustrating one example of 400 CORESET resource configuration for a corresponding SS/PBCH block.

FIG. 4 is a diagram illustrating one example of 400 CORESET resource configuration for a corresponding SS/PBCH block. As mentioned in 304, the UE 102 may determine the CORESET for the first search space set for PDCCH monitoring. As depicted in FIG. 4, the CORESET may comprise a sub-CORESET (408) and a sub-CORESET (412). In the time domain, the CORESET may comprise a first set of consecutive OFDM symbols (404) and a second set of consecutive OFDM symbols (410). Herein, the sub-CORESET (408) may alternatively be referred to as the CORESET in the first set of consecutive OFDM symbols (404), while the sub-CORESET (412) may alternatively be referred to as the CORESET in the second set of consecutive OFDM symbols (410). In other words, the CORESET in the first set of consecutive OFDM symbols (404) can be regarded as a first sub-CORESET 408 (or a first CORESET for the first search space set), while the CORESET in the second set of consecutive OFDM symbols (410) can be regarded as a second sub-CORESET 412 (or a second CORESET for the first search space set). The CORESET is a CORESET in both the first set of consecutive OFDM symbols and the second set of consecutive OFDM symbols.

The bandwidth 402 of the CORESET is same as that for 408 and 412. The bandwidth 402 is determined based on the first information and is a number of consecutive resource blocks $N_{RB}^{CORESET}$ (402). The number of consecutive OFDM symbols $N_{symb}^{CORESET}$ (404, 410) is determined based on the first information. The value of the $N_{RB}^{CORESET}$ (402) can be set to a non-zero integer such as 24, 48, 96. The value of the $N_{symb}^{CORESET}$ (404)) can be set to 1 symbol, 2 symbol, or 3 symbol. Here, the consecutive resource blocks $N_{RB}^{CORESET}$ (402) are expressed in units of (in a number of) the resource block with respect to the SCS of the CORESET for the first search space set. The consecutive symbols $N_{symb}^{CORESET}$(404) are expressed in units of (in a number of) the OFDM symbol with respect to the SCS of the CORESET for the first search space set.

In the present disclosure, the SCS of the CORESET may be indicated by the MIB from aa applicable SCS set. For example, if the UE acquires the MIB on an FR1 carrier frequency, the value of the SCS of the CORESET may be indicated as 15 kHz or 30 kHz among the SCS set {15 kHz, 30 kHz}. If the UE acquires the MIB on an FR2 carrier frequency, the value of the SCS of the CORESET may be indicated as 60 kHz or 120 kHz among the SCS set {60 kHz, 120 kHz}. Additionally, the SCS of the CORESET may be indicated by a RRC parameter from an applicable SCS set for corresponding frequency range as mentioned above.

The UE may further determine an offset (or a resource block offset) (406). The offset indicates a number of resource blocks defined from the smallest RB index of the CORESET for the first search space set to the smallest RB index of the common RB overlapping with the first RB of the corresponding SS/PBCH block with the first index. The value of the offset can be set to zero, or a non-zero integer. Here, the offset (406) are expressed in units of (in a number of) resource block with respect to the SCS of the CORESET for the first search space set.

For the detected SS/PBCH block with the first index, the UE may further determine one or more than one slots where the UE is configured to monitor the PDCCH in the first search space set. The CORESET may comprise one or more than one sub-CORESETs. The slots in which the one or more than one sub-CORESET exist may be different from each other. The UE may determine corresponding slot for corresponding sub-CORESET for PDCCH monitoring, respectively. Specifically, the UE may determine a first slot (an index of the first slot) in which the first set of consecutive OFDM symbols located and determine a second slot (an index of the second slot) in which the second set of consecutive OFDM symbols located.

For example, the UE may determine the first slot (the index of the first slot) at least based on the received first information (e.g. searchSpaceZero) and the first index of the detected SS/PBCH block. The UE may determine the index of the first slot $n_0$ as Formula (2) $n_0 = (O*2^u + \text{floor}(i*M)) \bmod N_{slot}^{frame, u}$ wherein the i is the first index of the detected SS/PBCH block, the O and M are provided by FIG. 5 or FIG. 6, and the u is SCS configuration of the CORESET for the first search space set for PDCCH monitoring. FIG. 5 illustrates one example 500 of parameters configuration for a set of consecutive symbols for PDCCH monitoring. FIG. 6 illustrates another example 600 of parameters configuration for a set of consecutive symbols for PDCCH monitoring. The function floor(x) means the function that takes as input a real number x and gives as output the maximum integer smaller than or equal to x. As above-mentioned, the first information includes a subpart with 4 bits (e.g. searchSpaceZero) to indicate the index in the FIG. 5 or FIG. 6. Therefore, based on the first information, the UE may determine the value of O and the value of M and determine the first symbols index for the first set of consecutive OFDM symbols. In other words, the index of the first slot is calculated based on the first information (the value of O and the value of M), the first index of the detected SS/PBCH block, the number of slots per frame with respect to the SCS of the CORESET ($N_{slot}^{frame, u}$), the SCS of the CORESET for the first search space set ($2^u$).

The UE may further determine a first frame with the system frame number (SFN) $SFN_{C,1}$ which the first slot is located in. The $SFN_{C,1}$ is determined by satisfying $(SFN_{C,1}) \bmod 2 = 0$ if $(\text{floor}((O*2^u + \text{floor}(i*M))/N_{slot}^{frame, u})) \bmod 2 = 0$. Or, the $SFN_{C,1}$ is determined by satisfying $(SFN_{C,1}) \bmod 2 = 1$ if $(\text{floor}((O*2^u + \text{floor}(i*M))/N_{slot}^{frame, u})) \bmod 2 = 1$. That is, if $(\text{floor}((O*2^u + \text{floor}(i*M))/N_{slot}^{frame, u})) \bmod 2 = 0$, the first slot is located in a first frame with even number, while if $(\text{floor}((O*2^u+\text{floor}(i*M))/N_{slot}^{frame, u}))\mod 2=1$, the first slot is located in a first frame with odd number.

After determining the index of the first slot, the UE may further determine a second slot (an index of the second slot). The UE may determine the index of the second slot based on the determined index of the first slot. For example, the second slot can be determined as a slot with a same index of the first slot. A second frame which the second slot is located in is a subsequent (adjacent) frame after the first frame. The first frame and the second frame maybe two consecutives frames.

Additionally or alternatively, the system frame number $SFN_{C,2}$ of the second frame may be determined by satisfying $(SFN_{C,2})\mod 2=1$ if $(\text{floor}((O*2^u+\text{floor}(i*M))/N_{slot}^{frame, u}))\mod 2=0$. Or, the $SFN_{C,2}$ is determined by satisfying $(SFN_{C,1})\mod 2=0$ if $(\text{floor}((O*2^u+\text{floor}(i*M))/N_{slot}^{frame, u}))\mod 2=1$. That is, if $(\text{floor}((O*2^u+\text{floor}(i*M))/N_{slot}^{frame, u}))\mod 2=0$, the second slot is located in the second frame with even number, while if $(\text{floor}((O*2^u+\text{floor}(i*M))/N_{slot}^{frame, u}))\mod 2=1$, the second slot is located in the second frame with odd number.

According to the FIG. 5 or FIG. 6, the first information may indicate an index to provide a value of M as 2. In this case, the UE may determine the second slot and/or the second frame by another way. For example, the UE may determine the first slot by same way as mentioned above. Then, in a case that there is no other set of consecutive OFDM symbols for a SS/PBCH block with an index other than the first index to exist in two consecutive slots starting from the first slot, the second slot is a subsequent (adjacent) slot after the first slot. That is, the first slot and the second slot are two consecutives slots.

In another example, the CORESET is transmitted in a periodicity of the detected SS/PBCH block with the first index. The periodicity of the SS/PBCH block may be provided by the MIB, SIBS, or RRC parameter. If the UE is not configured a periodicity of the half frames for receptions of the SS/PBCH blocks, the UE may assume the periodicity of the detected SS/PBCH block with the first index is a half frame. In this case, the periodicity of the CORESET is determined as a half frame.

Additionally or alternatively, the UE may determine the periodicity of the CORESET is a periodicity of 2 frames. A first PBCH may be transmitted in the first slot which the first set of consecutive OFDM symbols is located in. A second PBCH may be transmitted in the second slot which the second set of consecutive OFDM symbols is located. A first block (SS/PBCH block) with the first index comprises the first PBCH, primary synchronization signal (PSS), and the secondary synchronization signal. A second block (SS/PBCH block) with the first index may only comprise the second PBCH. In other words, the first set of consecutive OFDM symbols is located in a slot where the first block consisting of the PSS, SSS and PBCH is transmitted, while the second set of consecutive OFDM symbols is located in a slot where the second block only consisting of PBCH is transmitted. Here, the index of the first block and the index of the second block are same and correspond to the first index of the detected SS/PBCH block. The second block may also span 4 consecutive OFDM symbols, though the PSS and the SSS is not transmitted in the first OFDM symbols and third OFDM symbol of the second block, respectively.

The CORESET may or may not overlap with the second block in the time domain. In a case that the CORESET overlaps with the second block in the time domain and the overlapped OFDMs symbols is a symbol of the second block which is allocated for a purpose of PSS reception and/or SSS reception, the resource blocks during the overlapped OFDM symbols, which are allocated for PSS reception and/or SS reception, may be further used for the CORESET transmission.

In another example, each set may consist of a different number of consecutive OFDM symbols. The number of consecutive OFDM symbols for the first set can be determined based on the first information. On the other hand, the number of consecutive OFDM symbols for a set other than the first set can be determined by another way. For example, the number of consecutive OFDM symbols for the second set can be determined by a second information other than the first information described above. The second information may also be included in MIB (or SIB) broadcasted by the base station 160. Additionally, the second information may be a RRC parameter included in a RRC message. Additionally, the number of consecutive OFDM symbols for the second set can be a predetermined value. The first OFDM symbol for the second set may be located in a fixed symbol index of a slot. The slot can be also fixed in a radio frame.

In another implementation of the present disclosure, a mapping of each PDCCH candidate to a CORESET which comprise one or more sets of consecutive OFDM symbols is introduced.

The UE may detect a SS/PBCH block with a first index and may receive, from a base station, a MIB including first information related to a CORESET for a first search space set for the detected SS/PBCH block. The CORESET may comprise a first set of consecutive OFDM symbols and/or a second one or more sets of consecutive OFDM symbols. The one or more second set(s) of consecutive OFDM symbols may be transmitted after a first time offset from the first OFDM symbol for the first set of consecutive OFDM symbols. The UE may monitor a set of PDCCH candidates for the first search space set in the CORESET. The CORESET herein has CORESET index 0. The first search space set herein has search space set index 0.

An illustration of the first time offset applying to above-mentioned various implementations and/or examples is described below.

The first time offset may be indicated by second information (an RRC parameter). Or, the first time offset may be a predetermined duration. The predetermined duration can be depending on the SCS of the CORESET or can be a fixed duration regardless of the SCS of the CORESET.

Additionally or alternatively, the first time offset may be a duration expressed in number of frame where the number of frame for the first time offset is a fixed number regardless of the SCS of the CORESET. For example, the first time offset may be one radio frame.

Additionally or alternatively, the first time offset may be a duration expressed in number of half frame where the number of half frame for the first time offset is a fixed number regardless of the SCS of the CORESET. For example, the first time offset may be one half-frame.

Additionally or alternatively, the first time offset may be a duration expressed in units of millisecond where the value for the first time offset is a fixed number regardless of the SCS of the CORESET. For example, the first time offset may be 5 ms or 10 ms.

Additionally or alternatively, the first time offset is a duration expressed in number of slot where the number of slot for the first time offset is determined based on the SCS of the CORESET. According to the different SCS of the CORESET, the number of slot for the first time offset can be different.

Additionally or alternatively, the first time offset is a duration expressed in number of OFDM symbols where the number of OFDM symbols for the first time offset is determined depending on the SCS of the CORESET. According to the different SCS of the CORESET, the number of OFDM symbols for the first time offset can be different.

Additionally or alternatively, the first time offset is a duration expressed in a combination of two or more factors among the radio frame, half frame, millisecond, slot, and OFDM symbols. The first time offset maybe associated with the SCS of the SCS of the CORESET. Alternatively, the first time offset may be determined regardless of the SCS of the CORESET.

Figure 7:
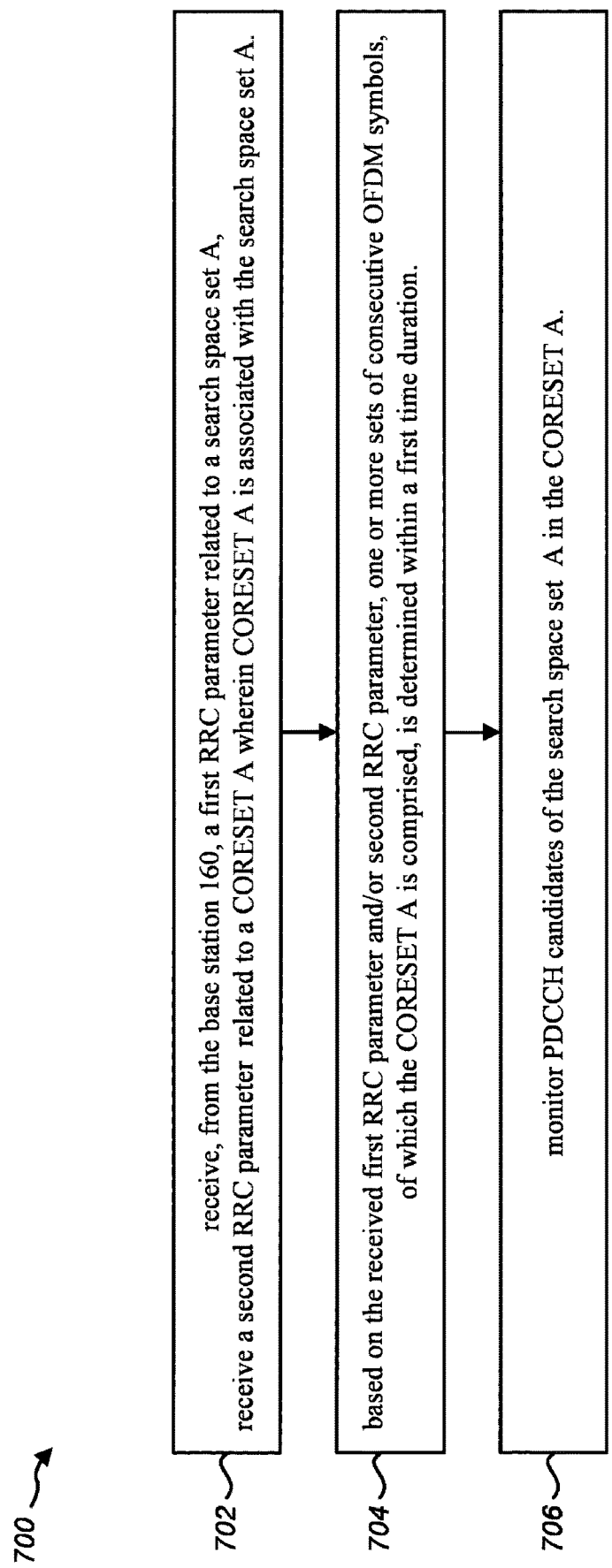
FIG. 7 is a flow diagram illustrating one implementation of a method 700 for determining a CORESET A for PDCCH monitoring by a UE 102.

FIG. 7 is a flow diagram illustrating one implementation of a method 700 for determining a CORESET A for PDCCH monitoring by a UE 102.

In the implementation of the present disclosure, a UE 102 may receive 702, a first radio resource control (RRC) parameter related to a search space set A. The UE 102 may receive a second RRC parameter related to a CORESET A. The CORESET A is associated with the search space set A. Specifically, the UE 102 may receive the first RRC parameter SearchSpace related to the search space set A. The first RRC parameter defines how and where to search for PDCCH candidates for a DCI format for the search space set A. The UE 102 may receive the second RRC parameter ControlResourceSet related to the CORESET A. The second RRC parameter configures a time and frequency control resource set in which to search for downlink control information. CORESET A may be a CORESET other than CORESET 0.

As depicted in the FIG. 2, the UE may determine the PDCCH monitoring occasions for monitoring one or more PDCCH candidates of a search space set s according to the received parameters such as SearchSpace and ControlResourceSet. In the FIG. 2, the UE may monitor a PDCCH candidate for the search space set s in one PDCCH monitoring occasion. In the implementation of the present disclosure, the UE 102 may utilize the same method as described in the FIG. 2 to determine, based on the received first RRC parameter and/or the second RRC parameter, the PDCCH monitoring occasions for the search space set A. However, in the implementation, the UE 102 may monitor a PDCCH candidate (a set of PDCCH candidates) in the CORESET A comprising one or more than one PDCCH monitoring occasions, which is different from what has been described in the FIG. 2 that a PDCCH candidate is monitored in a CORESET in one PDCCH monitoring occasion. In other words, the CORESET A in the implementation may comprise one or more PDCCH monitoring occasions other than a CORESET in the FIG. 2 which comprises one PDCCH monitoring occasion in the time domain. One PDCCH monitoring occasion is equivalent to a set of consecutive OFDM symbols. The number of consecutive OFDM symbols for each set is determined based on the second RRC parameter. The CORESET A may therefore comprise one or more sets of consecutive OFDM symbols.

Specifically, UE may determine to aggregate one or more sets of consecutive OFDM symbols within a first time duration to the CORESET A. The one or more sets of consecutive OFDM symbols within the first time duration are comprised of the CORESET A. In other words, the one or more PDCCH monitoring occasions (determined in the FIG. 2) within the first time duration are aggregated to a PDCCH monitoring occasion for the CORESET A. The aggregated one or more PDCCH monitoring occasions may be referred to as 'one PDCCH monitoring occasion for PDCCH candidates of the search space set A. The aggregated one or more sets of consecutive OFDM symbols may be referred to as 'one PDCCH monitoring occasion for PDCCH candidates of the search space set A.

The quantity of the aggregated one or more sets of consecutive OFDM symbols is calculated based on the first time duration, the first RRC parameter and/or the second RRC parameter. The first time duration may be determined based on a RRC parameter included in the first RRC parameter. The time resource of the CORESET A is determined based on the one or more RRC parameters included in the first RRC parameter and a RRC parameter (duration) included in the second RRC parameter.

For example, a base station may transmit, to a UE, a RRC parameter indicating the first time duration wherein the first time duration may be expressed in a number of one or more of OFDM symbols, slots, subframe, millisecond, frame. The UE may aggregate one or more sets of consecutive OFDM symbols to the CORESET A during the indicated first time duration.

Additionally or alternatively, the first RRC parameter includes a third RRC parameter (for example, monitoringSymbolsWithinSlot) indicating a first symbol for each of the one or more than one sets of consecutive OFDM symbols within a slot. The first time duration is determined as one slot. The CORESET A comprises one or more sets of consecutive OFDM symbols within a slot. The time resource of the CORESET A is determined based on the third RRC parameter and the RRC parameter (duration) included in the second RRC parameter.

Additionally or alternatively, the first RRC parameter further includes a forth RRC parameter indicating a first number of consecutive slots that the search space set A exists. The first time duration is determined as the first number of consecutive slots. The CORESET comprises one or more sets of consecutive OFDM symbols within the first number of consecutive slots. The time resource of the CORESET A is determined based on the third, fourth RRC parameters and the RRC parameter (duration) included in the second RRC parameter.

Additionally or alternatively, the first RRC parameter may further include a parameter to indicate the search space set A is either a CSS set or a USS set. In a case that the search space set A is the USS set, the number of consecutive OFDM symbols for each set is smaller than, equal to, or larger than 3 symbols. For example, the number of consecutive OFDM symbols can be configured as 1, 2, 3 or 6 symbols. In other words, in this case, the search space set A can be associated with a CORESET for which the RRC parameter duration can be set to 1, 2, 3 or 6 symbols. In a case that the search space set A is the CSS set, the number of consecutive OFDM symbols for a set is not larger than 3 symbols. In other words, in this case, the search space set A can be associated with a CORESET for which the RRC parameter duration can be set to 1, 2, 3 symbols. In this case, the search space set A cannot be associated with a CORESET for which the RRC parameter duration can be set to larger than 3 symbols.

At 706, the UE may monitor a set of PDCCH candidates for the search space set A in the CORESET A. Here, each PDCCH candidate for the search space set A is mapped in resource of the CORESET A. In other words, one PDCCH candidate for the search space set A may be mapped to the CORESET A comprising one or more than one set of consecutive OFDM symbols.

Usually, a UE may determine (allocate) the PDCCH candidate to be monitored based on a limit B and a limit C per slot. The limit B refers to a maximum number of monitored PDCCH candidates per slot per SCS configuration µ for a DL BWP for a single serving cell. The limit C refers to a maximum number of non-overlapped CCEs for channel estimation per slot per SCS configuration µ for a DL BWP for a single serving cell. The limit B and limit C per slot can be predefined with respect to the SCS configuration of PDCCH monitoring. If a UE is configured to monitor PDCCH candidates for configured search space set in a slot to cause either the number of monitored PDCCH to exceed the limit B or the number of non-overlapped CCEs to exceed the limit C, the UE may determine to drop one or more sets of PDCCH candidates of one or more configured USS set and may not allocate the one or more sets of PDCCH candidates for monitoring.

On the other hands, for the new type device, a UE may determine (allocate) the PDCCH candidate to be monitored based on a limit B1 and a limit C1 per the first time duration. The limit B1 refers to a maximum number of monitored PDCCH candidates per the first time duration per SCS configuration p for a DL BWP for a single serving cell. The limit C1 refers to a maximum number of non-overlapped CCEs for channel estimation per the first time duration per SCS configuration p for a DL BWP for a single serving cell. The limit B1 and limit C1 per the first time duration can be predefined with respect to the SCS configuration of PDCCH monitoring. If a UE is configured to monitor PDCCH candidates for configured search space set in the first time duration to cause either the number of monitored PDCCH to exceed the limit B1 or the number of non-overlapped CCEs to exceed the limit C1, the UE may determine to drop one or more sets of PDCCH candidates of one or more configured USS set and may not allocate the one or more sets of PDCCH candidates for monitoring.

To be more specific, for all USS sets configured within the first time duration, the UE (the new type device) may arrange each USS set in a set of USS sets in an ascending order of the USS set index. That is, the UE may determine PDCCH candidates to be allocated for monitoring in the first time duration in an ascending order of USS set index configured within the first time duration until a total number of counted PDCCH candidates to be allocated for monitoring in the first time duration reaches a first number (the limit B1) and/or a total number of counted non-overlapped CCEs to be allocated for monitoring in the first time duration reaches a second number (limit C1). The counted non-overlapped CCEs are the CCEs which are required by the corresponding counted PDCCH candidates. In other words, the UE may monitor a number of counted PDCCH candidates requiring a corresponding number of counted non-overlapped CCEs.

The UE may determine PDCCH candidates to be allocated for monitoring for each USS set according to the ascending order of the USS index in the first time duration. For each USS set with the configured search space set index, in a case that the total number of counted PDCCH candidates do not exceed the first number by counting a number of PDCCH candidates configured for the USS set and the total number of counted non-overlapped CCEs do not exceed a second number by counting a number of non-overlapped CCEs configured for the USS set, the number of PDCCH candidates configured for the USS set is counted to the total number of counted PDCCH candidates and the number of non-overlapped CCEs configured for the USS set is counted to the total number of counted non-overlapped CCEs. 'the number of PDCCH candidates configured for the USS set is counted to the total number of counted PDCCH candidates and the number of non-overlapped CCEs configured for the USS set is counted to the total number of counted non-overlapped CCEs' means that the UE may allocate all the number of PDCCH candidates configured for the USS set for monitoring to the USS set. That is, in this case, the UE may monitor PDCCH in the USS set with the allocated PDCCH candidates for monitoring. In this case, the UE may next determine PDCCH candidates to be allocated for monitoring for a subsequent USS set in the set of USS set. Here, a number of non-overlapped CCEs configured for a USS set means a number of non-overlapped CCEs required by the number of PDCCH candidates configured for the USS set. The number of non-overlapped CCEs may be further determined based on the CCEs which are required by the already allocated PDCCH candidates for monitoring for all search space sets. Note that, before the UE start to determine PDCCH candidates to be allocated for monitoring for each USS set during the first time duration, a total number of counted PDCCH candidates is set to the number of PDCCH candidates configured for the CSS set(s) if the CSS set(s) exist in the first time duration. If there are no CSS set(s) in the first time duration, the total number of counted PDCCH candidates starts from 0. Similarly, a total number of counted non-overlapped CCEs is set to the number of non-overlapped CCEs required by the PDCCH candidates configured for the CSS set(s). If there are no CSS set(s) in the first time duration, the total number of counted non-overlapped CCEs starts from 0.

In a case that either the total number of counted PDCCH candidates exceeds the first number by counting a number of PDCCH candidates configured for the USS set or the total number of counted non-overlapped CCEs exceeds the second number by counting a number of non-overlapped CCEs configured for the USS set, the number of PDCCH candidates configured for the USS set is not counted to the total number of counted PDCCH candidates and the number of non-overlapped CCEs configured for the USS set is not counted to the total number of counted non-overlapped CCEs. 'the number of PDCCH candidates configured for the USS set is not counted to the total number of counted PDCCH candidates and the number of non-overlapped CCEs configured for the USS set is not counted to the total number of counted non-overlapped CCEs' means that the UE may not allocate the number of PDCCH candidates configured for the USS set for monitoring to the USS set. That is, in this case, the UE may not monitor PDCCH in the USS set since there are not allocated PDCCH candidates for monitoring for the USS set. Moreover, the UE may not further determine PDCCH candidates to be allocated for monitoring for subsequent USS set whose location are after the USS set in the set of the USS sets.

Figure 8:
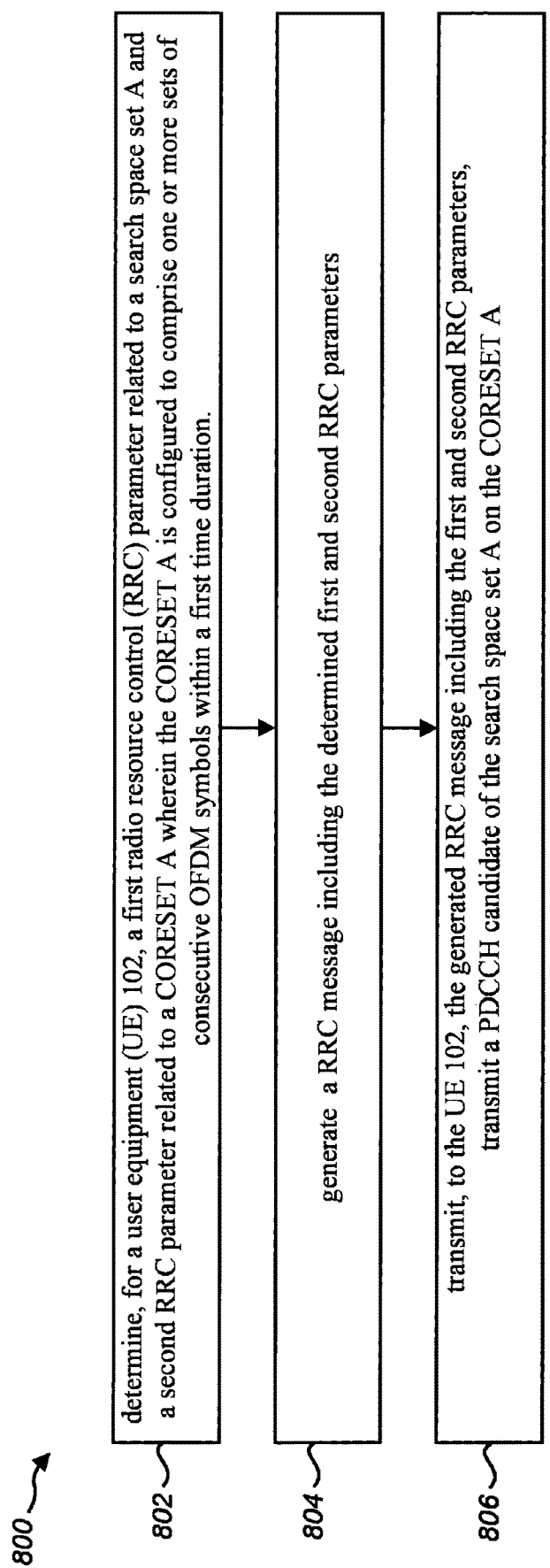
FIG. 8 is a flow diagram illustrating one implementation of a method 800 for determining a CORESET A for PDCCH monitoring by a base station 160.

FIG. 8 is a flow diagram illustrating one implementation of a method 800 for determining a CORESET A for PDCCH monitoring by a base station 160.

The base station 160 may determine 802, for the UE 102, a first radio resource control (RRC) parameter related to a search space set A and a second RRC parameter related to a CORESET A wherein the CORESET A is configured to comprise one or more sets of consecutive OFDM symbols within a first time duration. The first RRC parameter defines how and where to search for PDCCH candidates for a DCI format for the search space set A, while the second RRC parameter configures a time and frequency control resource set in which to search for downlink control information. At 802, the base station 160 may determine the time resource of the CORESET A within the first time duration. The details of the first time duration has been described in the FIG. 7.

The base station 160 may generate 804 a RRC message including the determined first RRC parameter and the second RRC parameter for the UE 102. The RRC message may include system information. The RRC message may be sent on a broadcast control channel (BCCH) logical channel, a common control channel (CCCH) logical channel or a dedicated control channel (DCCH) logical channel.

At 806, the base station 160 may transmit, to the UE 102, the generated RRC message including the first RRC parameter and the second RRC parameter. These RRC parameters cause (configure) the UE 102 to monitor a set of PDCCH candidates of the search space set A in the CORESET A. The base station 160 maps a PDCCH candidate of the search space set A in the resource of the CORESET A and transmit the PDCCH candidate on the CORESET A to the UE 102.

Figure 9:
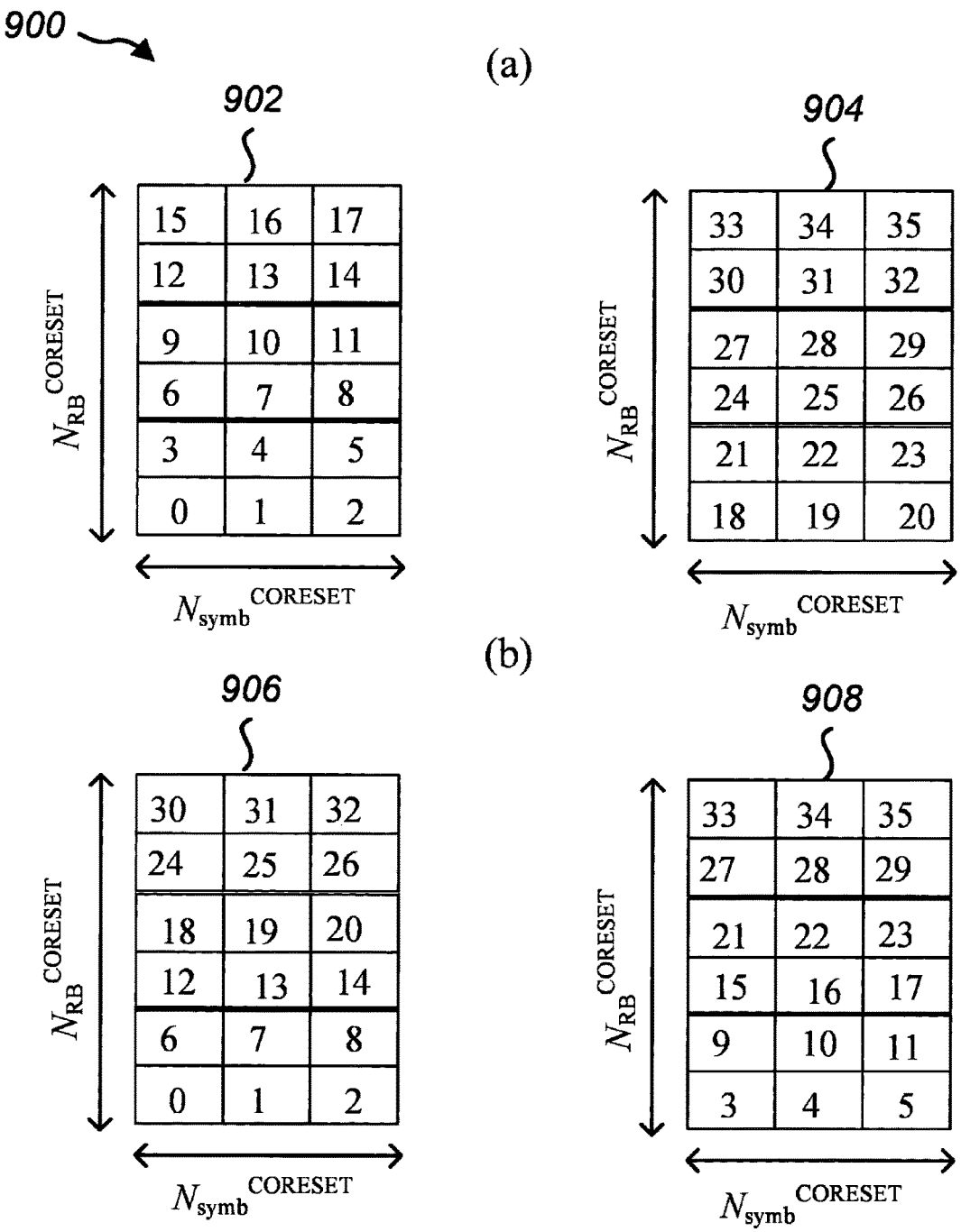
FIG. 9 is a diagram illustrating one example 900 of REG resource numbering for a CORESET.

FIG. 9 is a diagram illustrating one example 900 of REG resource numbering for a CORESET.

According to the various implementations of the present disclosure, the UE 102 may monitor a set of PDCCH candidates for a search space set in a CORESET which consist of a set of $N_{RB}^{CORESET}$ PRBs and one or more than one sets of $N_{symb}^{CORESET}$ consecutive OFDM symbols. For a CORESET only comprising one set of consecutive OFDM symbols, the REGs within the CORESET are numbered in increasing order in time-first manner, starting with 0 for the first OFDM symbol and the lowest-numbered resource block in the CORESET.

For a CORESET comprising more than one sets of consecutive OFDM symbols, two illustrations of the REG resource numbering are described in the FIG. 9. In FIGS. 9 (*a*) and (*b*), as an example, a CORESET for PDCCH monitoring for a search space set comprises two sets of consecutive OFDM symbols. In other words, the CORESET A comprises a first set of consecutive OFDM symbols (902, 906) and a second set of consecutive OFDM symbols (904 or 908). In FIG. 9 (*a*), REGs within the first set of consecutive OFDM symbols are firstly numbered in increasing order in time-first manner, starting with 0 for the first OFDM symbol and the lowest-numbered resource block in the 902, then REGs within the second set of consecutive OFDM symbols are continuously numbered in increasing order in time-first manner in the 904. The REGs within 902 of the CORESET are numbered by 0 to 17 by the time-first manner. The REGs within 904 of the CORESET are also numbered in increasing order in time-first manner, starting with 18 which is a subsequent number following a maximum-numbered REG number in the 902.

In FIG. 9 (*b*), regardless of whether a REG is in the first set 906 or the second set 908, REGs across the sets of the consecutive OFDM symbols for the CORESET are numbered in increasing order in time-first manner, starting with 0 for the first OFDM symbol and the lowest-numbered resource block in the first set.

Either (a) and (b) can be applied to the new device type. The bases station may determine one way to a UE according to the UE's channel property in time and frequency domain. The bases station may transmit, to a UE, a RRC parameter to indicate which one is utilized. The RRC parameter can be included in the RRC parameter SearchSpace. In this case, COERSETs with same CORESET index associated with different search space sets may have different REG mapping. Additionally, the RRC parameter can be included in the RRC parameter ControlResourceSet. In this case, regardless of the associated search space sets, the CORESET with same CORESET index may have same REG mapping.

A UE can be configured with multiple CORESETs. Each CORESET is associated with one CCE-to-REG mapping only. A PDCCH candidate for a search space sets may correspond to a set of CCEs in a CORESET associated with the search space set s. In other words, a UE can determine the CCE indexes for aggregation level L corresponding to PDCCH candidates of a USS for a USS set based on the value of C-RNTI addressed to the UE. The UE can determine the CCE indexes for aggregation level L corresponding to PDCCH candidates of a CSS for a CSS set without the value of C-RNTI addressed to the UE.

To be more specific, for a search space sets associated with CORESET p, the CCE indexes for aggregation level L corresponding to PDCCH candidate $m_{s,n\_CI}$ of the search space set in slot n for an active DL BWP of a serving cell corresponding to carrier indicator field value n_CI are given by Formula (3) $L*((Y_{p,n}+\text{floor}((m_{s,n\_CI}*N_{CCE,\ p})/(L*M_{s,max}^{(L)})+n\_CI) \bmod (\text{floor}(N_{CCE,p}/L)))+i$. The parameters in the Formula (3) are illustrated as below: for any CSS, $Y_{p,n}$ is equal to 0, while for a USS, $Y_{p,n}=(A_p*Y_{p,n-1})$ mod D where $Y_{p,-1}=n_{RNTI}\neq 0$, $A_p=39827$ for p mod 3=0, $A_p=39829$ for p mod 3=1, $A_p=39839$ for p mod 3=2, and D=65537; slot n can be denoted by $n_{s,f}^u$ representing the slot number within a radio frame with respect to the SCS configuration u; i=0, . . . , L−1; $N_{CCE,\ p}$ is the number of CCEs, numbered from 0 to ($N_{CCE,p}-1$), in CORESET p wherein the CORESET p herein is a CORESET (e.g. CORESET, first CORESET, CORESET A) comprising one or more sets of consecutive OFDM symbols; $n_{RNTI}$ is an value of C-RNTI provided by the base station for the UE; n_CI is the carrier indicator field value if the UE 102 is configured with a carrier indicator field for the serving cell on which PDCCH is monitored; otherwise, including for any CSS, the n_CI is equal to 0; $m_{s,n\_CI}=0, \ldots, M_{s,\ n\_CF}^{(L)}-1$, where $M_{s,n\_CI}^{(L)}$) is the number of PDCCH candidates the UE is configured to monitor for aggregation level L of the search space set s for a serving cell corresponding to n_CI; for any CSS, $M_{s,max}^{(L)}=M_{s,0}^{(L)}$; for a USS, is the maximum of $M_{s,n\_CI}^{(L)}$ over all configured n_CI values for a CCE aggregation level L of search space set s.

Reception of SS/PBCH blocks according to the present disclosure is illustrated as below.

Figure 10:
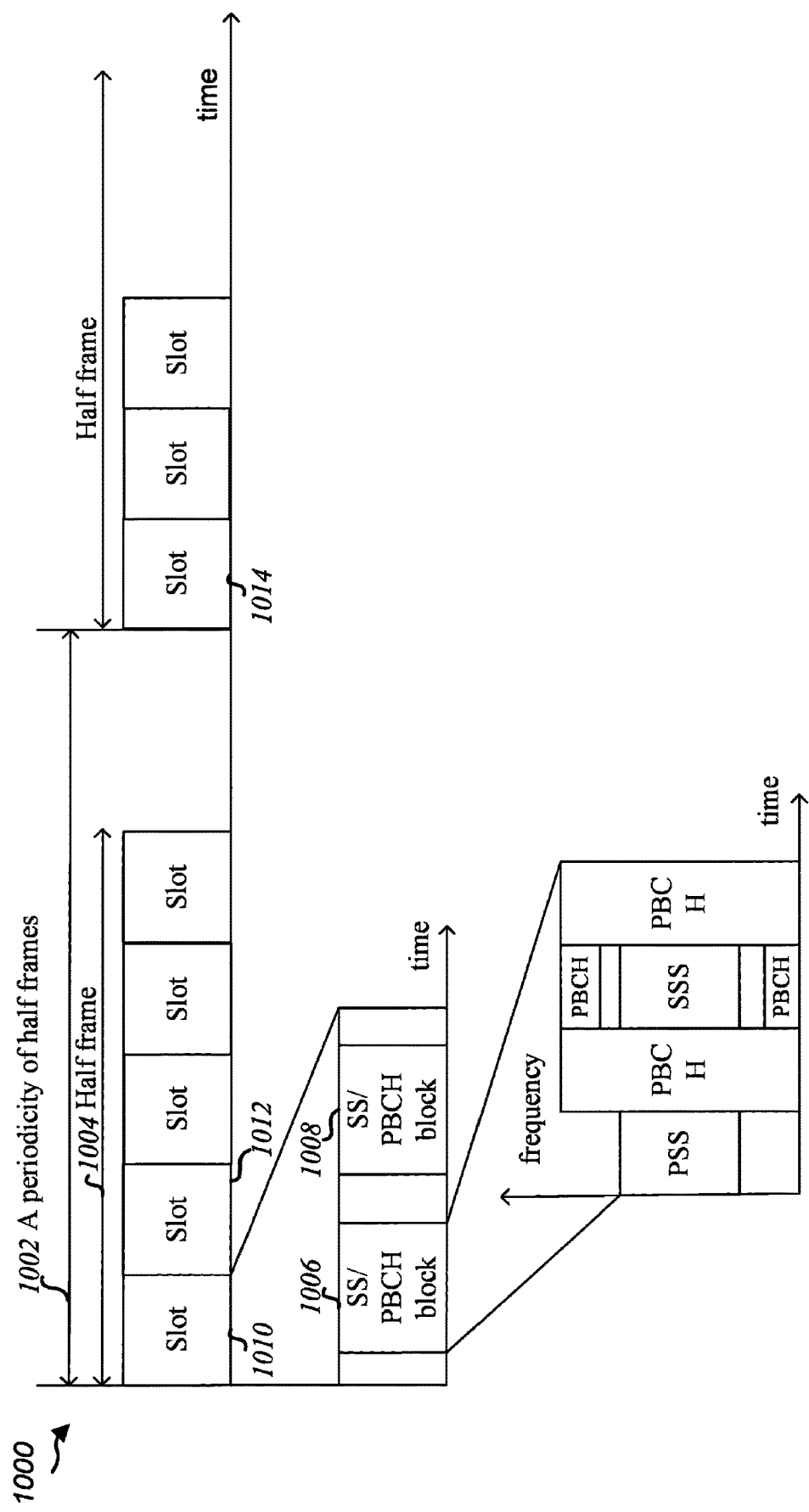
FIG. 10 is a diagram illustrating one example 1000 of SS/PBCH block transmission.

The SS/PBCH block is a unit block consisting of primary and secondary synchronization signals (PSS, SSS), each occupying 1 symbol and 127 subcarriers and PBCH spanning across 3 OFDM symbols and 240 subcarriers, but on one symbol leaving an unused part in the middle for SSS as show in FIG. 10. FIG. 10 is a diagram illustrating one example 1000 of SS/PBCH block transmission. The UE 102 receives/detect the SS/PBCH block to acquire time and frequency synchronization with a cell and detect the physical layer Cell ID of the cell. The possible time locations of SS/PBCH blocks within a half-frame are determined by subcarrier spacing and the periodicity of the half-frames where SS/PBCH blocks are transmitted is configured by the base station. During a half frame, different SS/PBCH blocks may be transmitted in different spatial directions (i.e. using different beams, spanning the coverage area of a cell). Within the frequency span of a carrier, multiple SS/PBCH blocks can be transmitted. For a half frame with SS/PBCH blocks, the first symbol indexes for candidate SS/PBCH blocks are determined according to the SCS of SS/PBCH blocks as follows, where index 0 corresponds to the first symbol of the first slot in a half-frame.

Case A—15 kHz SCS: the first symbols of the candidate SS/PBCH blocks have indexes of {2,8}+14*n. n can be either n=0, 1 or n=0, 1, 2, 3 depending on the carrier frequencies.

Case B—30 kHz SCS: the first symbols of the candidate SS/PBCH blocks have indexes of {4, 8, 16, 20}+28*n. n can be either n=0 or n=0, 1 depending on whether the carrier frequencies is larger than 3 GHz.

Case C—30 kHz SCS: the first symbols of the candidate SS/PBCH blocks have indexes of {2, 8}+14*n. n can be either n=0, 1 or n=0, 1, 2, 3 depending on the carrier frequencies.

Case D—120 kHz SCS: the first symbols of the candidate SS/PBCH blocks have indexes {4, 8, 16, 20}+28*n where n=0, 1, 2, 3, 5, 6, 7, 8, 10, 11, 12, 13, 15, 16, 17, 18.

Case E—240 kHz SCS: the first symbols of the candidate SS/PBCH blocks have indexes {8, 12, 16, 20, 32, 36, 40, 44}+56*n where n=0, 1, 2, 3, 5, 6, 7, 8.

The candidate SS/PBCH blocks in a half frame are assigned an SS/PBCH index. The candidate SS/PBCH blocks in a half frame are indexed in an ascending order in time from 0 to $L_{max}-1$. The UE 102 determines the 2 LSB bits, for $L_{max}=4$, or the 3 LSB bits, for $L_{max}>4$, of a SS/PBCH block index per half frame form a one-to-one mapping with an index of the DM-RS sequence transmitted in the PBCH. For $L_{max}=64$, the UE 102 determines the 3 MSB bits of the SS/PBCH block index per half frame from PBCH payload bits. That is, when the UE 102 detects/receives an SS/PBCH block, the UE 102 calculates an SS/PBCH index based on PBCH information and/or reference signal information (DMRS sequence) included in the detected SS/PBCH block. Moreover, upon detection of a SS/PBCH block with an index, the UE 102 may determine from the MIB that a CORESET for Type0-PDCCH CSS set, and the Type0-PDCCH CSS set.

FIG. 10 is an example of the Case A. In the FIG. 10, a half frame 1004 has 5 slot. According to the case A, when n=0, 1, the base station may transmit SS/PBCH blocks in the first two slots within the half frame 1004. When n=0, 1, 2, 3, the base station may transmit SS/PBCH blocks in the first four slots within the half frame 1004.

According to the Case A, the index for the first symbol of the first SS/PBCH block with index 0 1006 is an index 2 of the first slot 1010 in the half-frame 1004, the index for the first symbol of the second SS/PBCH block with index 1 1008 is an index 8 of the first slot 1010 in the half-frame 1004, the index for the first symbol of the third SS/PBCH block with index 2 is an index 2 of the second slot 1012 in the half-frame 1004, and so on.

The UE can be provided per serving cell by a RRC parameter indicating a periodicity of the half frames 1002 for reception of the SS/PBCH blocks for the serving cell. If the UE is not provided by the RRC parameter, the periodicity of the half frames 1002 for reception of the SS/PBCH blocks is a periodicity of a half frame. I this case, the 1002 is equivalent to the 1004. The periodicity is same for all SS/PBCH blocks in the serving cell. For example, the SS/PBCH with index 0 1006 is transmitted in the slot 1010. A next SS/PBCH with index 0 may be transmitted in a slot 1014 after the periodicity of half frames 1002 starting from the slot 1010.

Additionally, the UE performing initial cell selection, may assume that half frames with SS/PBCH blocks occur with a periodicity of 2 frames. That is, the UE may receive a SS/PBCH with an index in a slot and then may further receive a SS/PBCH block with the same index in a slot after the periodicity of 2 frames.

A UE may monitor a set of PDCCH candidate of a search space set in an associated CORESET. According to above implementations, the CORESET may comprise only one PDCCH monitoring occasion (as shown in the FIG. 2) so that UE may monitor a PDCCH candidate of the search space set in one PDCCH monitoring occasion. On the other hands, the CORESET may comprise more than one PDCCH monitoring occasions so that the UE may monitor a PDCCH candidate of the search space set in the aggregated more than one PDCCH monitoring occasions. Whether a UE needs to aggregate more than one PDCCH monitoring occasions for a CORESET for PDCCH monitoring may be determined by the base station. The base station may, based on the channel condition of the UE, determine which way to be used for the UE. For example, if a UE is in a poor channel condition or in a cell-edge, the base station may configure the UE to use the aggregation of more than one PDCCH monitoring occasions for PDCCH reception so that the PDCCH reception reliability or the coverage can be improved. If a UE is in a good channel condition or in a center of a cell, the base station may configure the UE to receive PDCCH in one PDCCH monitoring occasion in the CORESET.

Additionally, a UE may indicate, to a base station 160, a capability related to a number of its reception antennas, supportable RF bandwidth and so on. The base station 160 may, based on the reported capability from a UE, determine which way to be used for the UE. For some UEs with less reception antennas or reduced RF bandwidth, the aggregation of more than one PDCCH monitoring occasions for PDCCH reception can improve the PDCCH reception reliability and/or the coverage and would be beneficial.

The base station therefore may transmit, to the UE, a. RRC parameter to indicate either one PDCCH monitoring occasion or aggregation of more than one PDCCH monitoring occasions is utilized for monitoring a PDCCH candidate. The RRC parameter herein can be included in the RRC parameter SearchSpace or in the RRC parameter ControlResourceSet. If the RRC parameter configure the UE to utilize one PDCCH monitoring occasion for PDCCH monitoring, a PDCCH candidate of the search space set is mapped to a CORESET in one PDCCH monitoring occasion. If the RRC parameter configure the UE to utilize aggregation of more than one PDCCH monitoring occasions for PDCCH monitoring, a PDCCH candidate of the search space set is mapped to a CORESET comprising more than one PDCCH monitoring occasions.

Moreover, the base station 160 may, based on the reported capability from a UE, determine whether configure a number of consecutive symbols of the CORESET $N_{symb}^{CORESET}$ being more than 3 symbols (e.g. 6 symbols) for the UE. For example, if a UE reported this kind of the capability, the base station may configure a number of consecutive symbols of the CORESET $N_{symb}^{CORESET}$ as 6 symbols for the UE. For the UEs who do not report the capability, the base station may not configure a number of consecutive symbols of the CORESET $N_{symb}^{CORESET}$ as 6 symbols for the UE and the base station may configure a number of consecutive symbols of the CORESET $N_{symb}^{CORESET}$ being smaller than or equal to 3 symbols.

Likewise, the base station 160 may, based on the reported capability from a UE, determine whether configure an CCE aggregation level L being larger than 16 (e.g. 24) for the UE. Different code rates for the control channels are realized by aggregating different number of CCE. For example, if a UE reported this kind of the capability, the base station may configure an CCE aggregation level L as 24 for the UE so that a lower code rate for PDCCH reception can be realized.

For the UEs who do not report the capability, the base station may not configure an CCE aggregation level L as 624 for the UE and the base station may configure an CCE aggregation level L being smaller than or equal to 16 such as the 1, 2, 4, 8, 16.

Additionally, the base station 160 may, based on the reported capability from a UE, determine whether the limit B and limit C per slot or limit B1 and limit C1 per the first time duration is utilized for the UE. For example, if a UE reported this kind of the capability, the base station may configure the UE to drop or allocate the PDCCH candidates for monitoring based on the limit B1 and limit C1. For the UEs who do not report the capability may drop or allocate the PDCCH candidates for monitoring based on the limit B and the limit C.

Figure 11:
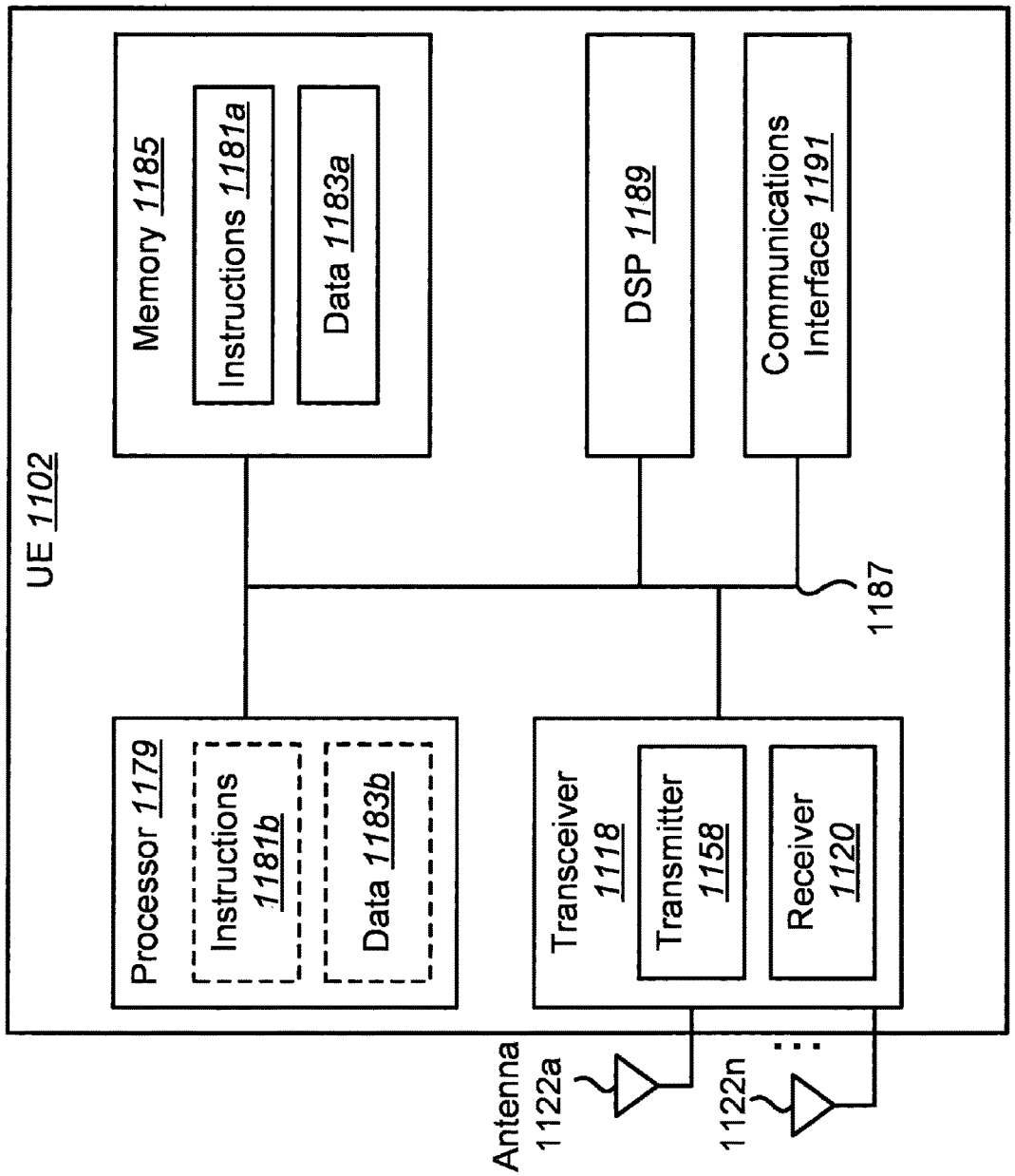
FIG. 11 illustrates various components that may be utilized in a UE.

FIG. 11 illustrates various components that may be utilized in a UE 1102. The UE 1102 described in connection with FIG. 11 may be implemented in accordance with the UE 102 described in connection with FIG. 1. The UE 1102 includes a processor 1181 that controls operation of the UE 1102. The processor 1181 may also be referred to as a central processing unit (CPU). Memory 1187, which may include read-only memory (ROM), random access memory (RAM), a combination of the two or any type of device that may store information, provides instructions 1183a and data 1185a to the processor 1181. A portion of the memory 1187 may also include non-volatile random access memory (NVRAM). Instructions 1183b and data 1185b may also reside in the processor 1181. Instructions 1183b and/or data 1185b loaded into the processor 1181 may also include instructions 1183a and/or data 1185a from memory 1187 that were loaded for execution or processing by the processor 1181. The instructions 1183b may be executed by the processor 1181 to implement one or more of the methods 200 described above.

The UE 1102 may also include a housing that contains one or more transmitters 1158 and one or more receivers 1120 to allow transmission and reception of data. The transmitter(s) 1158 and receiver(s) 1120 may be combined into one or more transceivers 1118. One or more antennas 1122a-n are attached to the housing and electrically coupled to the transceiver 1118.

The various components of the UE 1102 are coupled together by a bus system 1189, which may include a power bus, a control signal bus and a status signal bus, in addition to a data bus. However, for the sake of clarity, the various buses are illustrated in FIG. 11 as the bus system 1189. The UE 1102 may also include a digital signal processor (DSP) 1191 for use in processing signals. The UE 1102 may also include a communications interface 1193 that provides user access to the functions of the UE 1102. The UE 1102 illustrated in FIG. 11 is a functional block diagram rather than a listing of specific components.

Figure 12:
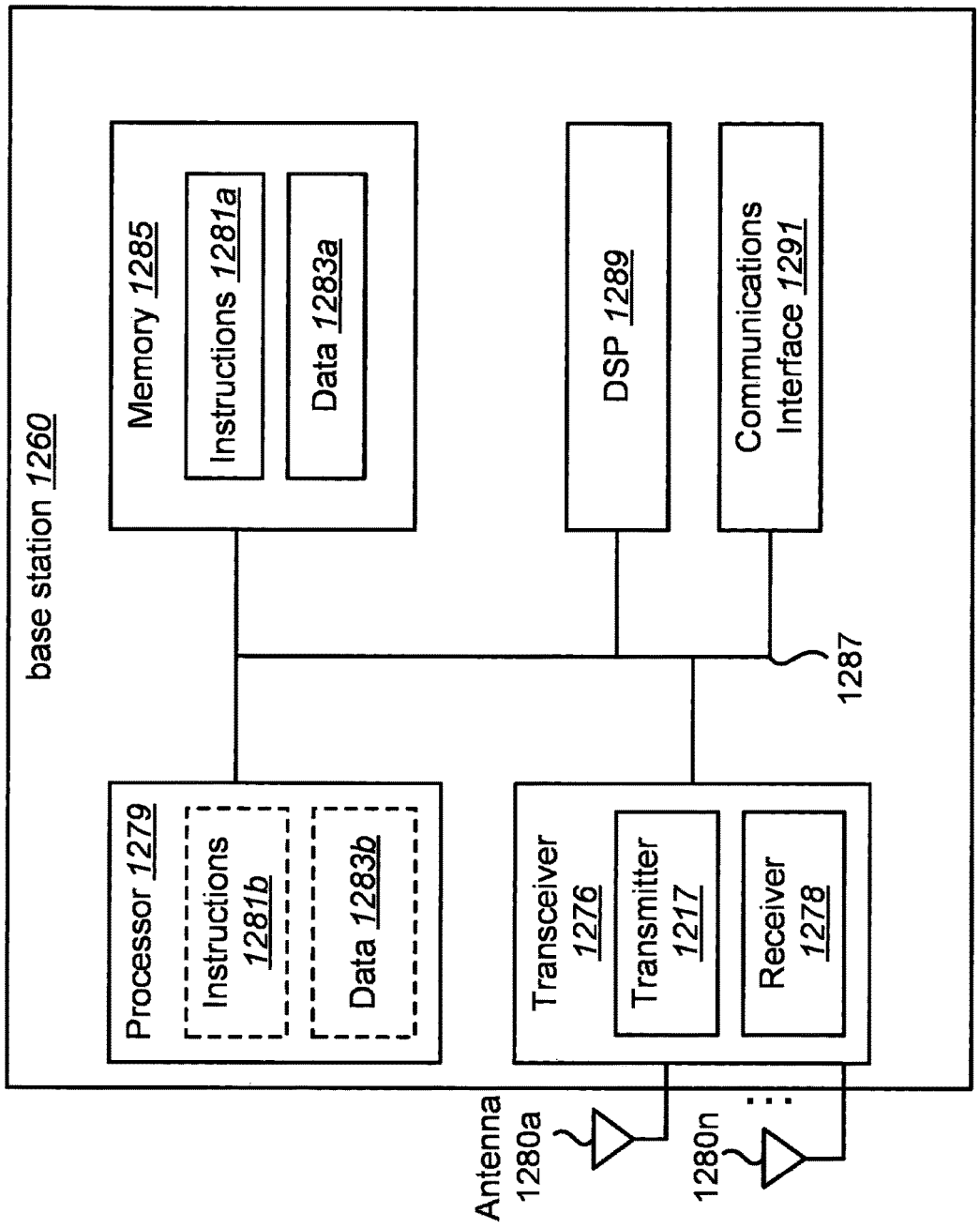
FIG. 12 illustrates various components that may be utilized in a base station.

FIG. 12 illustrates various components that may be utilized in a base station 1260. The base station 1260 described in connection with FIG. 12 may be implemented in accordance with the base station 160 described in connection with FIG. 1. The base station 1260 includes a processor 1281 that controls operation of the base station 1260. The processor 1281 may also be referred to as a central processing unit (CPU). Memory 1287, which may include read-only memory (ROM), random access memory (RAM), a combination of the two or any type of device that may store information, provides instructions 1283a and data 1285a to the processor 1281. A portion of the memory 1287 may also include non-volatile random access memory (NVRAM). Instructions 1283b and data 1285b may also reside in the processor 1281. Instructions 1283b and/or data 1285b loaded into the processor 1281 may also include instructions 1283a and/or data 1285a from memory 1287 that were loaded for execution or processing by the processor 1281. The instructions 1283b may be executed by the processor 1281 to implement one or more of the methods 300 described above.

The base station 1260 may also include a housing that contains one or more transmitters 1217 and one or more receivers 1278 to allow transmission and reception of data. The transmitter(s) 1217 and receiver(s) 1278 may be combined into one or more transceivers 1276. One or more antennas 1280a-n are attached to the housing and electrically coupled to the transceiver 1276.

The various components of the base station 1260 are coupled together by a bus system 1289, which may include a power bus, a control signal bus and a status signal bus, in addition to a data bus. However, for the sake of clarity, the various buses are illustrated in FIG. 12 as the bus system 1289. The base station 1260 may also include a digital signal processor (DSP) 1291 for use in processing signals. The base station 1260 may also include a communications interface 1293 that provides user access to the functions of the base station 1260. The base station 1260 illustrated in FIG. 12 is a functional block diagram rather than a listing of specific components.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using circuitry, a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

The invention claimed is:

1. A user equipment (UE), comprising:
reception circuitry configured to detect a SS/PBCH block with a first index, to receive, from a base station, a master information block (MIB) including first information related to a control resource set (CORESET) for a first search space set for the detected SS/PBCH block; and
processing circuitry configured to monitor a set of physical downlink control channel (PDCCH) candidates for the first search space set in the CORESET, wherein;
the CORESET comprises a first set of consecutive OFDM symbols and a second set of consecutive OFDM symbols,
the CORESET is transmitted by a first time periodicity, and
the second set of consecutive OFDM symbols is transmitted after a first time offset from the first OFDM symbol for the first set of consecutive OFDM symbols.

2. The UE of claim 1, wherein:
the reception circuitry is configured to further receive second information, and
the second information indicates the first time offset.

3. The UE of claim 1, wherein:
the first time offset is a duration expressed in number of slots, and
the number of slots is determined depending on the subcarrier spacing (SCS) of the CORESET.

4. The UE of claim 1, wherein:
the number of consecutive OFDM symbols for the first set and the number of consecutive OFDM symbols for the second sets are determined based on the first information, and
the number of consecutive OFDM symbols for the first set is same as that for the second set.

5. The UE of claim 1, wherein:
the index of the CORESET is CORESET index 0, the index of the first search space set is search space set index 0,
a first slot which the first set of consecutive OFDM symbols is located in is at least determined based on the first information and the first index of the detected SS/PBCH block,
a second slot which the second set of consecutive OFDM symbols is located in is a slot with a same index of the first slot in a second frame, and the second frame is a subsequent frame after a first frame which the first slot is located in.

6. The UE of claim 1, wherein:
the index of the CORESET index is CORESET index 0, the index of the first search space set is search space set index 0,
the CORESET is transmitted in a periodicity of the detected SS/PBCH block with the first index,
a first PBCH is transmitted in a slot which the first set of consecutive OFDM symbols is located in, and
a second PBCH is transmitted in a slot which the second set of consecutive OFDM symbols is located in.

7. The UE of claim 6, wherein:
the first PBCH, primary synchronization signal, and secondary synchronization signal are comprised of a first block with the first index, and
only the second PBCH is comprised of a second block with the first index.

8. A base station, comprising:
transmission circuitry configured to transmit a SS/PBCH block with a first index, to transmit, to a user equipment (UE), a master information block (MIB) including first information related to a control resource set (CORESET) for a first search space set for the detected SS/PBCH block; and
processing circuitry configured to determine resource of the CORESET used for transmitting a set of physical downlink control (PDCCH) candidates for the first search space set, wherein:
the CORESET comprises a first set of consecutive OFDM symbols and a second set of consecutive OFDM symbols,
the CORESET is transmitted by a first time periodicity, and
the second set of consecutive OFDM symbols is transmitted after a first time offset from the first OFDM symbol for the first set of consecutive OFDM symbols.

9. The base station of claim 8, wherein:
the transmission circuitry is configured to further transmit second information, and
the second information indicates the first time offset.

10. The base station of claim 8, wherein:
the first time offset is a duration expressed in number of slots, and
the number of slots is determined depending on the subcarrier spacing (SCS) of the CORESET.

11. The base station of claim 8, wherein:
the number of consecutive OFDM symbols for the first set and the number of consecutive OFDM symbols for the second sets are determined based on the first information, and
the number of consecutive OFDM symbols for the first set is same as that for the second set.

12. The base station of claim 8, wherein:
the index of the CORESET is CORESET index 0, the index of the first search space set is search space set index 0,
a first slot which the first set of consecutive OFDM symbols is located in is at least determined based on the first information and the first index of the detected SS/PBCH block,
a second slot which the second set of consecutive OFDM symbols is located in is a slot with a same index of the first slot in a second frame, and the second frame is a subsequent frame after a first frame which the first slot is located in.

13. The base station of claim 8, wherein:
the index of the CORESET index is CORESET index 0, the index of the first search space set is search space set index 0,
the CORESET is transmitted in a periodicity of the detected SS/PBCH block with the first index,
a first PBCH is transmitted in a slot which the first set of consecutive OFDM symbols is located in, and
a second PBCH is transmitted in a slot which the second set of consecutive OFDM symbols is located in.

14. The base station of claim 13, wherein:
the first PBCH, primary synchronization signal, and secondary synchronization signal are comprised of a first block with the first index, and
only the second PBCH is comprised of a second block with the first index.

15. A method by a user equipment (UE), comprising:
detecting a SS/PBCH block with a first index;
receiving, from a base station, a master information block (MIB) including first information related to a control resource set (CORESET) for a first search space set for the detected SS/PBCH block; and monitoring a set of physical downlink control channel (PDCCH) candidates for the first search space set in the CORESET, wherein:

the CORESET comprises a first set of consecutive OFDM symbols and a second set of consecutive OFDM symbols, the CORESET is transmitted by a first time periodicity, and the second set of consecutive OFDM symbols is transmitted after a first time offset from the first OFDM symbol for the first set of consecutive OFDM symbols.

* * * * *